(12) United States Patent
Cohen et al.

(10) Patent No.: US 8,070,931 B1
(45) Date of Patent: Dec. 6, 2011

(54) ELECTROCHEMICAL FABRICATION METHOD INCLUDING ELASTIC JOINING OF STRUCTURES

(75) Inventors: Adam L. Cohen, Los Angeles, CA (US); Vacit Arat, La Canada Flintridge, CA (US); Michael S. Lockard, Lake Elizabeth, CA (US); Dennis R. Smalley, Newhall, CA (US)

(73) Assignee: Microfabrica Inc., Van Nuys, CA (US)

( * ) Notice: Subject to any disclaimer, the term of this patent is extended or adjusted under 35 U.S.C. 154(b) by 514 days.

(21) Appl. No.: 12/345,624

(22) Filed: Dec. 29, 2008

Related U.S. Application Data

(63) Continuation-in-part of application No. 11/506,586, filed on Aug. 18, 2006, now Pat. No. 7,611,616, and a continuation-in-part of application No. 11/435,809, filed on May 16, 2006, now abandoned, and a continuation-in-part of application No. 10/677,556, filed on Oct. 1, 2003, now abandoned, and a continuation-in-part of application No. 10/434,103, filed on May 7, 2003, now Pat. No. 7,160,429.

(60) Provisional application No. 61/018,229, filed on Dec. 31, 2007, provisional application No. 60/709,614, filed on Aug. 19, 2005, provisional application No. 60/681,788, filed on May 16, 2005, provisional application No. 60/379,182, filed on May 7, 2002, provisional application No. 60/430,809, filed on Dec. 3, 2002, provisional application No. 60/415,374, filed on Oct. 1, 2002.

(51) Int. Cl.
*C25D 5/02* (2006.01)
(52) U.S. Cl. ........................ 205/118; 205/223
(58) Field of Classification Search .................. 205/118, 205/223
See application file for complete search history.

(56) References Cited

U.S. PATENT DOCUMENTS

| | | |
|---|---|---|
| 5,190,637 A | 3/1993 | Guckel |
| 6,027,630 A | 2/2000 | Cohen |
| 6,790,377 B1 | 9/2004 | Cohen |

(Continued)

OTHER PUBLICATIONS

Cohen, et al., "EFAB: Batch Production of Functional, Fully-Dense Metal Parts with Micron-Scale Features", Proc. 9th Solid Freeform Fabrication, the University of Texas at Austin, Aug. 1998, pp. 161.

(Continued)

*Primary Examiner* — Luan Van
(74) *Attorney, Agent, or Firm* — Dennis R. Smalley

(57) ABSTRACT

Embodiments are directed to methods for forming multi-layer three-dimensional structures involving the joining of at least two structural elements, at least one of which is formed as a multi-layer three-dimensional structure, wherein the joining occurs via one of: (1) elastic deformation and elastic recovery and subsequent retention of elements relative to each other, (2) relative deformation of an initial portion of at least one element relative to another portion of the at least one element until the at least two elements are in a desired retention position after which the deformation is reduced or eliminated and a portion of at least one element is brought into position which in turn locks the at least two elements together via contact with one another including contact with the initial portion of at least one element, or (3) moving a retention region of one element into the retention region of the other element, without deformation of either element, along a path including a loading region of the other element and wherein during normal use the first and second elements are configured relative to one another so that the loading region of the second elements is not accessible to the retention region of the first element.

28 Claims, 25 Drawing Sheets

U.S. PATENT DOCUMENTS

| | | |
|---|---|---|
| 7,109,118 B2 | 9/2006 | Cohen et al. |
| 7,160,429 B2 | 1/2007 | Cohen et al. |
| 7,195,989 B2 | 3/2007 | Lockard et al. |
| 7,198,704 B2 | 4/2007 | Cohen et al. |
| 7,229,542 B2 | 6/2007 | Bang |
| 7,235,166 B2 | 6/2007 | Cohen et al. |
| 7,239,219 B2 | 7/2007 | Brown et al. |
| 7,250,101 B2 | 7/2007 | Thompson et al. |
| 7,252,861 B2 | 8/2007 | Smalley |
| 7,288,178 B2 | 10/2007 | Cohen et al. |
| 7,291,254 B2 | 11/2007 | Cohen et al. |
| 7,368,044 B2 | 5/2008 | Cohen et al. |
| 7,498,714 B2 | 3/2009 | Lockard et al. |
| 7,501,328 B2 | 3/2009 | Lockard et al. |
| 7,611,616 B2 | 11/2009 | Cohen et al. |
| 7,686,770 B2 | 3/2010 | Cohen |
| 2003/0221968 A1 | 12/2003 | Cohen et al. |
| 2004/0000489 A1 | 1/2004 | Zhang et al. |
| 2004/0004001 A1 | 1/2004 | Cohen et al. |
| 2004/0065550 A1 | 4/2004 | Zhang |
| 2004/0065555 A1 | 4/2004 | Zhang |
| 2004/0134772 A1 | 7/2004 | Cohen et al. |
| 2004/0146650 A1 | 7/2004 | Lockard et al. |
| 2005/0029109 A1 | 2/2005 | Zhang et al. |
| 2005/0067292 A1 | 3/2005 | Thompson et al. |
| 2005/0072681 A1 | 4/2005 | Cohen et al. |
| 2005/0142739 A1 | 6/2005 | Kumar et al. |
| 2005/0230261 A1 | 10/2005 | Cohen et al. |
| 2006/0108678 A1 | 5/2006 | Kumar et al. |
| 2006/0282065 A1 | 12/2006 | Cohen |
| 2007/0045121 A1 | 3/2007 | Cohen et al. |
| 2007/0158200 A1 | 7/2007 | Cohen et al. |
| 2007/0198038 A1 | 8/2007 | Cohen et al. |
| 2007/0219459 A1 | 9/2007 | Cohen |
| 2007/0265648 A1 | 11/2007 | Cohen |
| 2008/0050524 A1 | 2/2008 | Kumar et al. |

OTHER PUBLICATIONS

Adam L. Cohen, et al., "EFAB: Rapid, Low-Cost Desktop Micromachining of High Aspect Ratio True 3-D MEMS", Proc. $12^{th}$ IEEE Micro Electro Mechanical Systems Workshop, IEEE, Jan. 17-21, 1999, pp. 244-251.

F. Tseng, et al., "EFAB: High Aspect Ratio, Arbitrary 3-D Metal Microstructures Using a Low-Cost Automated Batch Process", MEMS Symposium, ASME 1999 International Mechanical Engineering Congress and Exposition, Nov. 1999.

Adam L. Cohen, "3-D Micromachining by Electrochemical Fabrication", Micromachine Devices, Mar. 1999, pp. 6-7.

Gang Zhang, et al., "EFAB: Rapid Desktop Manufacturing of True 3-D Microstructures", Proc. $2^{nd}$ International Conference on Integrated MicroNanotechnology for Space Applications, the Aerospace Co., Apr. 1999.

F. Tseng, et al., "EFAB: High Aspect Ratio, Arbitrary 3-D Metal Microstructures Using a Low-Cost Automated Batch Process", $3^{rd}$ International Workshop on High Aspect Ratio Microstructure Technology (HARMST'99), Jun. 1999.

Adam L. Cohen, et al., "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, Sep. 1999.

Adam L. Cohen, "Electrochemical Fabrication (EFABTM)", Chapter 19 of the MEMS Handbook, edited by Mohamed Gad-El-Hak, CRC Press, 2002, pp. 19/1-19/23.

"Microfabrication—Rapid Prototyping's Killer Application", Rapid Prototyping Report, CAD/CAM Publishing, Inc., Jun. 1999, pp. 1-5.

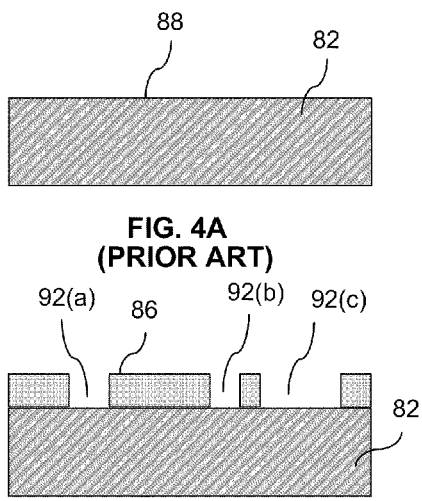
FIG. 4A
(PRIOR ART)
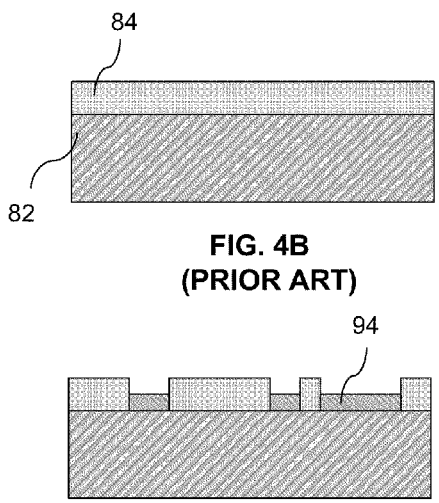
FIG. 4B
(PRIOR ART)
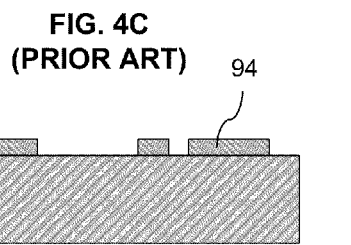
FIG. 4C
(PRIOR ART)
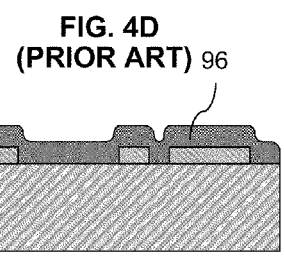
FIG. 4D
(PRIOR ART)
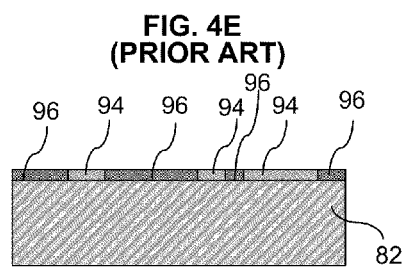
FIG. 4E
(PRIOR ART)
FIG. 4F
(PRIOR ART)
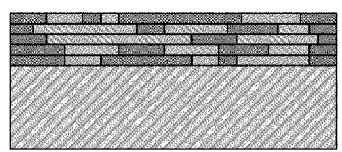
FIG. 4G
(PRIOR ART)
FIG. 4H
(PRIOR ART)
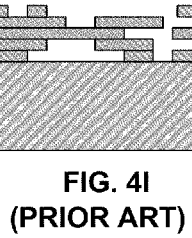
FIG. 4I
(PRIOR ART)

ELECTROCHEMICAL FABRICATION METHOD INCLUDING ELASTIC JOINING OF STRUCTURES

RELATED APPLICATIONS

The application claims benefit of U.S. Provisional Application 61/018,229, filed Dec. 31, 2007, and is a continuation-in-part of U.S. patent application Ser. No. 11/506,586, filed Aug. 18, 2006 now U.S. Pat. No. 7,611,616 which in turn claims benefit of U.S. Provisional Patent Application No. 60/709,614, filed Aug. 19, 2005, and is also a continuation-in-part of U.S. patent application Ser. Nos. 11/435,809 now abandoned and 10/677,556 now abandoned, respectively filed on May 16, 2006 and Oct. 1, 2003; the '809 application in turn claims benefit of 60/681,788, filed May 16, 2005 and is a continuation-in-part of Ser. No. 10/434,103, filed on May 7, 2003 now U.S. Pat. No. 7,160,429 which in turn claims benefit of 60/379,182, filed on May 7, 2002, and 60/430,809, filed Dec. 3, 2002; the '556 application in turn claims benefit of 60/415,374, filed Oct. 1, 2002. Each of these applications is hereby incorporated herein by reference as if set forth in full herein.

FIELD OF THE INVENTION

The present invention relates generally to the field of electrochemically fabricating multi-layer three dimensional (e.g. micro-scale or meso-scale) structures, parts, components, or devices where each layer is formed from a plurality of deposited materials and more specifically to such fabrication methods including the elastic or snap together joining of structures two or more structures at least one of which is formed by such a layering process.

BACKGROUND OF THE INVENTION

Electrochemical Fabrication

An electrochemical fabrication technique for forming three-dimensional structures from a plurality of adhered layers is being commercially pursued by Microfabrica® Inc. (formerly MEMGen Corporation) of Van Nuys, Calif. under the name EFAB®.

Various electrochemical fabrication techniques were described in U.S. Pat. No. 6,027,630, issued on Feb. 22, 2000 to Adam Cohen. Some embodiments of this electrochemical fabrication technique allow the selective deposition of a material using a mask that includes a patterned conformable material on a support structure that is independent of the substrate onto which plating will occur. When desiring to perform an electrodeposition using the mask, the conformable portion of the mask is brought into contact with a substrate, but not adhered or bonded to the substrate, while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. such masks have come to be known as INSTANT MASKS™ and the process known as INSTANT MASKING™ or INSTANT MASK™ plating. Selective depositions using conformable contact mask plating may be used to form single selective deposits of material or may be used in a process to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p 161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p 244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFABTM)", Chapter 19 of The MEMS Handbook, edited by Mohamed Gad-El-Hak, CRC Press, 2002.

(9) Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

An electrochemical deposition for forming multilayer structures may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate. Typically this material is either a structural material or a sacrificial material.

2. Then, blanket depositing at least one additional material by electrodeposition so that the additional deposit covers both the regions that were previously selectively deposited onto, and the regions of the substrate that did not receive any previously applied selective depositions. Typically this material is the other of a structural material or a sacrificial material.

3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to an immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed. The removed material is a sacrificial material while the material that forms part of the desired structure is a structural material.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated (the pattern of conformable material is complementary to the pattern of material to be deposited). At least one CC mask is used for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for multiple CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first operation, the conformable portion of the CC mask is placed in registration with and pressed against a selected portion of (1) the substrate, (2) a previously formed layer, or (3) a previously deposited portion of a layer on which deposition is to occur. The pressing together of the CC mask and relevant substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A-1C. FIG. 1A shows a side view of a CC mask 8 consisting of a conformable or deformable (e.g. elastomeric) insulator 10 patterned on an anode 12. The anode has two functions. One is as a supporting material for the patterned insulator 10 to maintain its integrity and alignment since the pattern may be topologically complex (e.g., involving isolated "islands" of insulator material). The other function is an anode for the electroplating operation. FIG. 1A also depicts a substrate 6, separated from mask 8, onto which material will be deposited during the process of forming a layer. CC mask plating selectively deposits material 22 onto substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 1C.

The CC mask plating process is distinct from a "through-mask" plating process in that in a through-mask plating process the separation of the masking material from the substrate would occur destructively. Furthermore in a through mask plating process, opening in the masking material are typically formed while the masking material is in contact with and adhered to the substrate. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D-1G. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the substrate on which plating is to occur (e.g. separate from a three-dimensional (3D) structure that is being formed). CC masks may be formed in a variety of ways, for example, using a photolithographic process. All masks can be generated simultaneously, e.g. prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A-2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A illustrates that the passing of current causes material 2 within the plating solution and material 2 from the anode 12 to be selectively transferred to and plated on the substrate 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e. sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A-3C. The system 32 consists of several subsystems 34, 36, 38, and 40. The substrate holding subsystem 34 is depicted in the upper portions of each of FIGS. 3A-3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source (not shown) for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which feet 68 of subsystem 34 may sit. Subsystem 38 also includes appropriate electrical connections (not shown) for connecting the anode to an appropriate power supply (not shown) for driving the blanket deposition process.

The planarization subsystem 40 is shown in the lower portion of FIG. 3C and includes a lapping plate 52 and associated motion and control systems (not shown) for planarizing the depositions.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

The '630 patent additionally teaches that the electroplating methods disclosed therein can be used to manufacture elements having complex microstructure and close tolerances between parts. An example is given with the aid of FIGS. 14A-14E of that patent. In the example, elements having parts that fit with close tolerances, e.g., having gaps between about 1-5 um, including electroplating the parts of the device in an unassembled, preferably pre-aligned, state and once fabricated. In such embodiments, the individual parts can be moved into operational relation with each other or they can simply fall together. Once together the separate parts may be retained by clips or the like.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing through mask exposures. A first layer of a primary metal is electroplated onto an exposed plating base to fill a void in a photoresist (the photoresist forming a through mask having a desired pattern of openings), the photoresist is then removed and a secondary metal is electroplated over the first layer and over the plating base. The exposed surface of the secondary metal is then machined down to a height which exposes the first metal to produce a flat uniform surface extending across both the primary and secondary metals. Formation of a second layer may then begin by applying a photoresist over the first layer and patterning it (i.e. to form a second through mask) and then repeating the process that was used to produce the first layer to produce a second layer of desired configuration. The process is repeated until the entire structure is formed and the secondary metal is removed by etching. The photoresist is formed over the plating base or previous layer by casting and patterning of the photoresist (i.e. voids formed in the photoresist) are formed by exposure of the photoresist through a patterned mask via X-rays or UV radiation and development of the exposed or unexposed areas.

The '637 patent teaches the locating of a plating base onto a substrate in preparation for electroplating materials onto the substrate. The plating base is indicated as typically involving the use of a sputtered film of an adhesive metal, such as chromium or titanium, and then a sputtered film of the metal that is to be plated. It is also taught that the plating base may be applied over an initial layer of sacrificial material (i.e. a layer or coating of a single material) on the substrate so that the structure and substrate may be detached if desired. In such cases after formation of the structure the sacrificial material forming part of each layer of the structure may be removed along the initial sacrificial layer to free the structure. Substrate materials mentioned in the '637 patent include silicon, glass, metals, and silicon with protected semiconductor devices. A specific example of a plating base includes about 150 angstroms of titanium and about 300 angstroms of nickel, both of which are sputtered at a temperature of 160° C. In another example it is indicated that the plating base may consist of 150 angstroms of titanium and 150 angstroms of nickel where both are applied by sputtering.

Electrochemical Fabrication provides the ability to form prototypes and commercial quantities of miniature objects, parts, structures, devices, and the like at reasonable costs and in reasonable times. In fact, Electrochemical Fabrication is an enabler for the formation of many structures that were hitherto impossible to produce. Electrochemical Fabrication opens the spectrum for new designs and products in many industrial fields. Even though Electrochemical Fabrication offers this new capability and it is understood that Electrochemical Fabrication techniques can be combined with designs and structures known within various fields to produce new structures, certain uses for Electrochemical Fabrication provide designs, structures, capabilities and/or features not known or obvious in view of the state of the art.

A need exists in various fields for miniature devices having improved characteristics, reduced fabrication times, reduced fabrication costs, simplified fabrication processes, greater versatility in device design, improved selection of materials, improved material properties, more cost effective and less risky production of such devices, and/or more independence between geometric configuration and the selected fabrication process.

SUMMARY OF THE INVENTION

It is an object of some embodiments of the invention to provide an improved method for forming multi-layer three-dimensional structures involving the joining of at least two structural elements, at least one of which is formed as a multi-layer three-dimensional structure, via elastic deformation and elastic recovery and subsequent retention of elements relative to each other. In some embodiments the joined elements remain movable relative to each other while in others they may lock into fixed positions.

It is an object of some embodiments of the invention to provide an improved method for forming multi-layer three-dimensional structures involving the joining of at least two structural elements, at least one of which is formed as a multi-layer three-dimensional structure, via relative deformation of an initial portion of at least one element relative to another portion of the at least one element until the at least two elements are in a desired retention position after which the deformation is reduced or eliminated and a portion of at least one element is brought into position which in turn locks the at least two elements together via contact with one another including contact with the initial portion of at least one element. In some embodiments the joined elements remain movable relative to each other while in other they may lock into fixed positions.

It is an object of some embodiments of the invention to provide an improved method for forming multi-layer three-dimensional structures involving the joining of at least first and second structural elements, at least one of which is formed as a multi-layer three-dimensional structure, wherein the first element has at least a retention region and the second element has at least a loading region connected via a path to a retention region wherein the first and second elements are joined to one another by moving the retention region of one element into the retention region of the other element, without deformation of either element, along the path including the loading region and wherein during normal use the first and second elements are configured relative to one another that the loading region of the second elements is not accessible to the retention region of the first element.

It is an object of some embodiments of the invention to provide a meso-scale (i.e. millimeter scale) or micro-scale device that includes a first layered structural element joined to a second non-layered structural element by elastic deformation of at least one of the elements during joining and elastic retention after joining.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all objects be addressed by any single aspect of the invention even though that may be the case with regard to some aspects.

A first aspect of the invention provides a method for forming a multi-element three-dimensional structure, including: (A) forming a first element of the multi-element three-dimensional structure from a plurality of successively formed layers, wherein each successive layer comprises at least two materials and is formed on and adhered to a previously formed layer, one of the at least two materials is a structural material and the other of the at least two materials is a sacrificial material, and wherein each successive layer defines a successive cross-section of the three-dimensional structure, and wherein the forming of each of the plurality of successive layers includes: (i) depositing a first of the at least two materials; (ii) depositing a second of the at least two materials; (iii) planarizing the first and second materials; and (B) after the forming of the plurality of successive layers, separating at least a portion of the sacrificial material from multiple layers of the structural material to reveal the first element of the multi-element three-dimensional structure; (C) supplying a second element of the multi-element three-dimensional structure; and (D) bringing the first and second elements into contact with one another and elastically deforming at least an initial deformation portion of one of the elements relative to the other element to bring the at least two elements into a desired retention configuration which is maintained at least in part by the structural strength of the elements and the at least partial reformation of the deformation portion as the elements move into the retention configuration.

Numerous variations of the first aspect of the invention exist and include, for example: (1) only one of the first and second elements is formed from a plurality of adhered layers; (2) both of the first and second elements are formed from a plurality of adhered layers; (3) only one of the first and second elements are deformed during the elastic deforming by an amount which is greater than a tolerance used in forming the physical dimensions of the element; (4) both of the first and second elements are deformed during the elastic deforming by amounts greater than a tolerance used in forming the physical dimensions of the elements; (5) the first and second elements remain movable relative to each other after joining; (6) the first and second elements become fixed relative to each other after joining; (7) the first and second elements are linked to one another prior to joining via a linkage that undergoes plastic deformation as the first and second elements are brought into retention configuration; (8) the first and second elements are not connected to one another prior to bringing them into the retention configuration; (9) the first element is also separated from a substrate on which it was formed; (10) a third element is held in place relative to the first and second elements by the joining of the first and second elements; and

(11) joining a third element to the assembly of the first and second elements by elastically joining the third element directly to one or both of the first and second elements.

A second aspect of the invention provides a method for forming a multi-element three-dimensional structure, including: (A) forming a first element of the multi-element three-dimensional structure from a plurality of successively formed layers, wherein each successive layer includes at least two materials and is formed on and adhered to a previously formed layer, wherein one of the at least two materials is a structural material and the other of the least two materials is a sacrificial material, and wherein each successive layer defines a successive cross-section of the three-dimensional structure, and wherein the forming of each of the plurality of successive layers includes: (i) depositing a first of the at least two materials; (ii) depositing a second of the at least two materials; (iii) planarizing the first and second materials; and (B) after the forming of the plurality of successive layers, separating at least a portion of the sacrificial material from multiple layers of the structural material to reveal the first element of the multi-element three-dimensional structure; (C) supplying a second element of the multi-element three-dimensional structure; (D) deforming at least a deformation portion of at least one of the first and second elements and bringing the first and second elements into a desired retention position; (E) reducing or eliminating the deformation as or after the first and second elements are brought into the desired retention position; (F) moving a locking element into position to strengthen the deformation portion of the at least one of the first and second elements after the first and second elements are brought into the desired retention position so that the first and second elements are more strongly locked together in the retention position than they otherwise would be in the absence of the locking element.

Numerous variations of the second aspect of the invention exist and include, for example: (1) only one of the first and second elements is formed from a plurality of adhered layers; (2) both the of the first and second elements are formed from a plurality of adhered layers; (3) only one of the first and second elements are deformed during the elastic deforming by an amount which is greater than a tolerance used in forming the physical dimensions of the element; (4) both of the first and second elements are deformed during the elastic deforming by amounts greater than a tolerance used in forming the physical dimensions of the elements; (5) the first and second elements remain movable relative to each other after joining; (6) the first and second elements become fixed relative to each other after joining; (7) the first and second elements are linked to one another prior to joining via a linkage that undergoes plastic deformation as the first and second elements are brought into retention configuration; (8) the first and second elements are not connected to one another prior to bringing them into the retention configuration; (9) the first element is also separated from a substrate on which it was formed; (10) a third element is held in place relative to the first and second elements by the joining of the first and second elements; and (11) joining a third element to the assembly of the first and second elements by elastically joining the third element directly to one or both of the first and second elements; and (12) the locking element includes a portion of another element.

A third aspect of the invention provides a method for forming a multi-element three-dimensional structure, including: (A) forming a first element of the multi-element three-dimensional structure from a plurality of successively formed layers, wherein each successive layer includes at least two materials and is formed on and adhered to a previously formed layer, wherein one of the at least two materials is a structural material and the other of the at least two materials is a sacrificial material, and wherein each successive layer defines a successive cross-section of the three-dimensional structure, and wherein the forming of each of the plurality of successive layers includes: (i) depositing a first of the at least two materials; (ii) depositing a second of the at least two materials; (iii) planarizing the first and second materials; and (B) after the forming of the plurality of successive layers, separating at least a portion of the sacrificial material from multiple layers of the structural material to reveal the first element of the multi-element three-dimensional structure, wherein the first element has at least a retention region; (C) supplying a second element of the multi-element three-dimensional structure wherein the second element has a retention region and wherein at least one of the first and second elements includes a loading region connected via a path to the retention region of the element; (D) joining the first and second elements to one another by moving the retention region of one element into the retention region of the other element, without deformation of either element, along the path including the loading region and wherein during normal use the first and second elements are configured relative to one another so that the loading region of one of the elements is not accessible to the retention region of the other of the first or second element.

Numerous variations of the third aspect of the invention exist and include, for example: (1) only one of the first and second elements is formed from a plurality of adhered layers; (2) both the of the first and second elements are formed from a plurality of adhered layers; (3) only one of the first and second elements is deformed during the elastic deforming by an amount which is greater than a tolerance used in forming the physical dimensions of the element; (4) both of the first and second elements are deformed during the elastic deforming by amounts greater than a tolerance used in forming the physical dimensions of the elements; (5) the first and second elements remain movable relative to each other after joining; (6) the first and second elements become fixed relative to each other after joining; (7) the first and second elements are linked to one another prior to joining via a linkage that undergoes plastic deformation as the first and second elements are brought into retention configuration; (8) the first and second elements are not connected to one another prior to bringing them into the retention configuration; (9) the first element is also separated from a substrate on which it was formed; (10) a third element is held in place relative to the first and second elements by the joining of the first and second elements; (11) joining a third element to the assembly of the first and second elements by elastically joining the third element directly to one or both of the first and second elements; and (12) both the first and second elements include loading regions.

The disclosure of the present invention provides three primary embodiments for joining separately formed elements to make multi-element structures wherein at least one of the elements is formed in a multi-layer manner with each successive layer including at least two materials, one of which is a structural material and the other of which is a sacrificial material, and wherein each successive layer defines a successive cross-section of the three-dimensional structure, and wherein the forming of each of the plurality of successive layers includes: (i) depositing a first of the at least two materials; (ii) depositing a second of the at least two materials; and (B) after the forming of the plurality of successive layers, separating at least a portion of the sacrificial material from the structural material to reveal the three-dimensional structure.

Other aspects of the invention will be understood by those of skill in the art upon review of the teachings herein. Other aspects of the invention may involve combinations of the above noted aspects of the invention. Other aspects of the invention may involve apparatus that can be used in implementing one or more of the above method aspects of the invention and or specific devices that can be formed via the above noted method aspects of the invention. These other aspects of the invention may provide various combinations of the aspects presented above as well as provide other configurations, structures, functional relationships, and processes that have not been specifically set forth above.

BRIEF DESCRIPTION OF THE DRAWINGS

FIGS. 4A-4F schematically depict the formation of a first layer of a structure using adhered mask plating where the blanket deposition of a second material overlays both the openings between deposition locations of a first material and the first material itself FIG. 4G depicts the completion of formation of the first layer resulting from planarizing the deposited materials to a desired level.

FIGS. 4H and 4I respectively depict the state of the process after formation of the multiple layers of the structure and after release of the structure from the sacrificial material.

DETAILED DESCRIPTION OF PREFERRED EMBODIMENTS

Electrochemical Fabrication in General

Figure 1A:
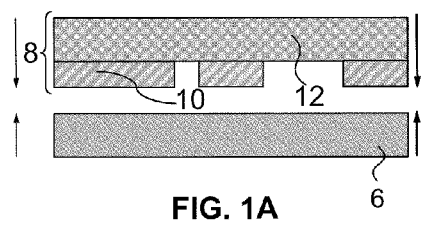
FIGS. 1A-1C schematically depict side views of various stages of a CC mask plating process, while FIGS. 1D-G schematically depict a side views of various stages of a CC mask plating process using a different type of CC mask.
Figure 1B:
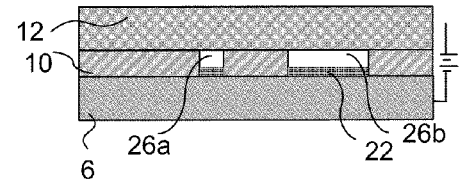
Figure 1C:
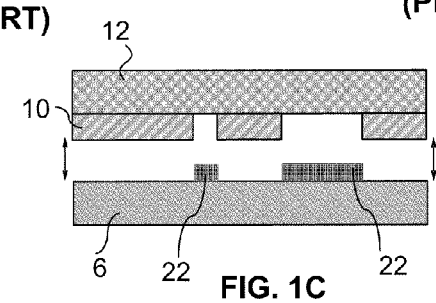
Figure 1D:
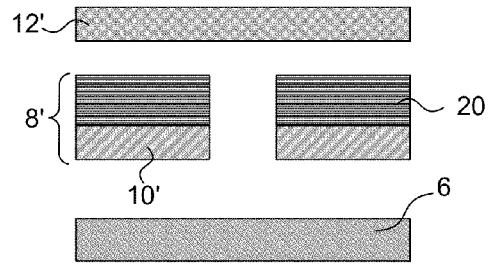
Figure 1E:
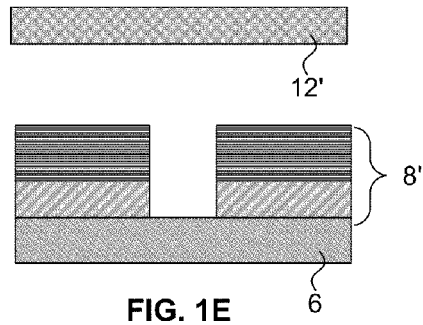
Figure 1F:
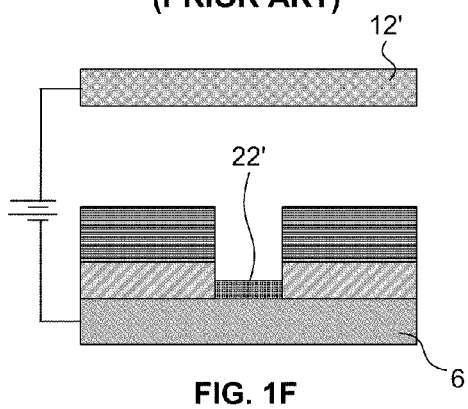
Figure 1G:
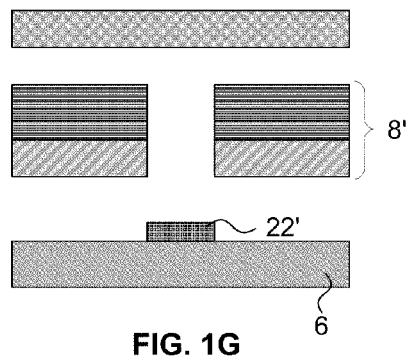
Figure 2A:
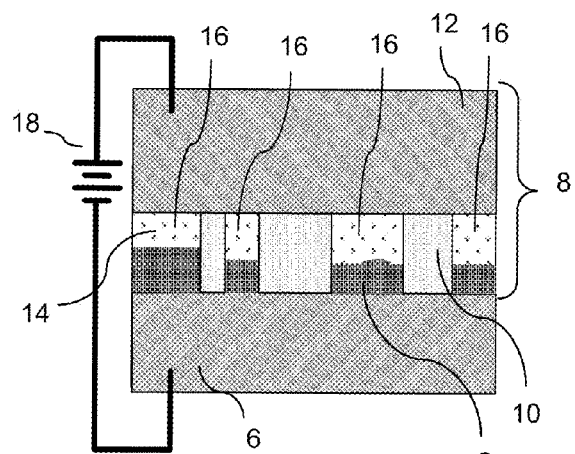
FIGS. 2A-2F schematically depict side views of various stages of an electrochemical fabrication process as applied to the formation of a particular structure where a sacrificial material is selectively deposited while a structural material is blanket deposited.
Figure 2B:
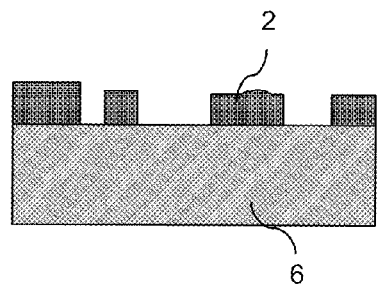
Figure 2C:
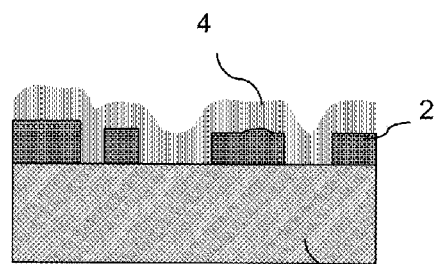
Figure 2D:
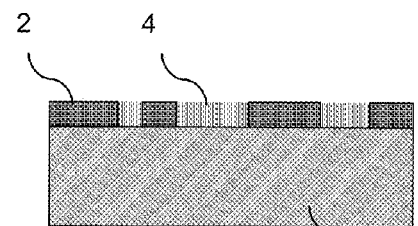
Figure 2E:
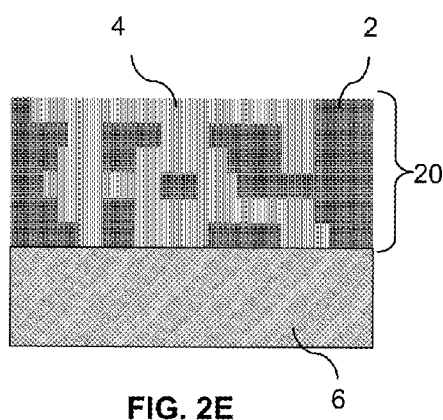
Figure 2F:
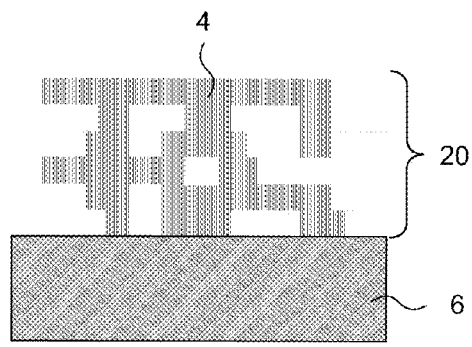
Figure 3A:
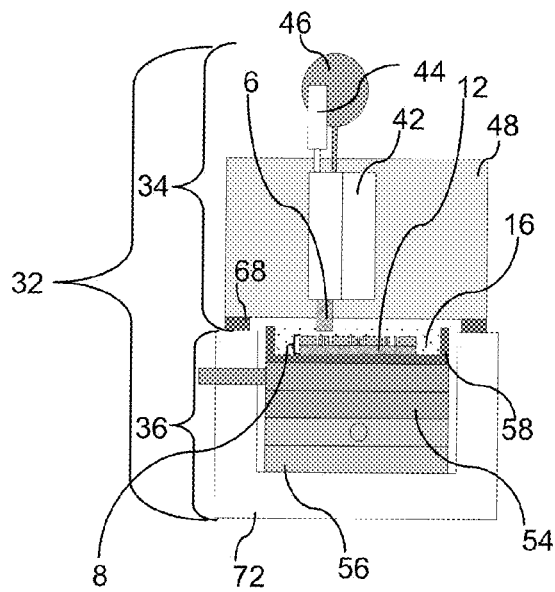
FIGS. 3A-3C schematically depict side views of various example subassemblies that may be used in manually implementing the electrochemical fabrication method depicted in FIGS. 2A-2F.
Figure 3B:
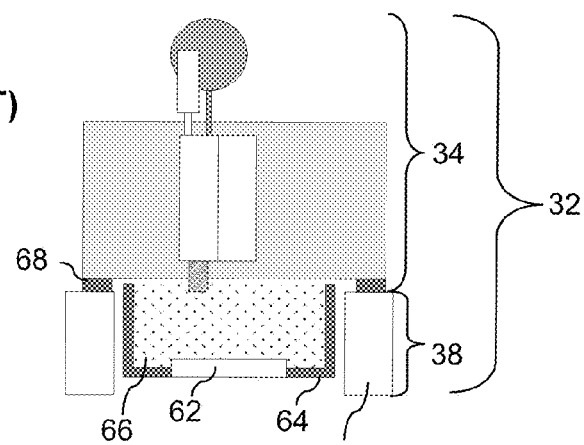
Figure 3C:
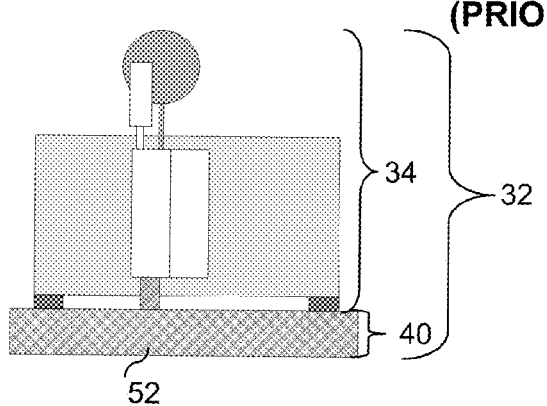

FIGS. 1A-1G, 2A-2F, and 3A-3C illustrate various features of one form of electrochemical fabrication. Other electrochemical fabrication techniques are set forth in the '630 patent referenced above, in the various previously incorporated publications, in various other patents and patent applications incorporated herein by reference. Still others may be derived from combinations of various approaches described in these publications, patents, and applications, or are otherwise known or ascertainable by those of skill in the art from the teachings set forth herein. All of these techniques may be combined with those of the various embodiments of various aspects of the invention to yield enhanced embodiments. Still other embodiments may be derived from combinations of the various embodiments explicitly set forth herein.

FIGS. 4A-4I illustrate various stages in the formation of a single layer of a multi-layer fabrication process where a second metal is deposited on a first metal as well as in openings in the first metal so that the first and second metal form part of the layer. In FIG. 4A a side view of a substrate 82 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 4D a metal 94 (e.g. nickel) is shown as having been electroplated into the openings 92(a)-92(c). In FIG. 4E the photoresist has been removed (i.e. chemically stripped) from the substrate to expose regions of the substrate 82 which are not covered with the first metal 94. In FIG. 4F a second metal 96 (e.g. silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B-4 G several times to form a multi-layer structure are shown where each layer consists of two materials. For most applications, one of these materials is removed as shown in FIG. 4I to yield a desired 3-D structure 98 (e.g. component or device).

Various embodiments of various aspects of the invention are directed to formation of three-dimensional structures from materials some of which may be electrodeposited or electroless deposited. Some of these structures may be formed form a single build level formed from one or more deposited materials while others are formed from a plurality of build layers each including at least two materials (e.g. two or more layers, more preferably five or more layers, and most preferably ten or more layers). In some embodiments, layer thicknesses may be as small as one micron or as large as fifty microns. In other embodiments, thinner layers may be used while in other embodiments, thicker layers may be used. In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable. In the present application meso-scale and millimeter scale have the same meaning and refer to devices that may have one or more dimensions extending into the 0.5-20 millimeter range, or somewhat larger and with features positioned with precision in the 10-100 micron range and with minimum features sizes on the order of 100 microns.

The various embodiments, alternatives, and techniques disclosed herein may form multi-layer structures using a single patterning technique on all layers or using different patterning techniques on different layers. For example, various embodiments of the invention may perform selective patterning operations using conformable contact masks and masking operations (i.e. operations that use masks which are contacted to but not adhered to a substrate), proximity masks and masking operations (i.e. operations that use masks that at least partially selectively shield a substrate by their proximity to the substrate even if contact is not made), non-conformable masks and masking operations (i.e. masks and operations based on masks whose contact surfaces are not significantly conformable), and/or adhered masks and masking operations (masks and operations that use masks that are adhered to a substrate onto which selective deposition or etching is to occur as opposed to only being contacted to it). Conformable contact masks, proximity masks, and non-conformable contact masks share the property that they are preformed and brought to, or in proximity to, a surface which is to be treated (i.e. the exposed portions of the surface are to be treated). These masks can generally be removed without damaging the mask or the surface that received treatment to which they were contacted, or located in proximity to. Adhered masks are generally formed on the surface to be treated (i.e. the portion of that surface that is to be masked) and bonded to that surface such that they cannot be separated from that surface without being completely destroyed damaged beyond any point of reuse. Adhered masks may be formed in a number of ways including (1) by application of a photoresist, selective exposure of the photoresist, and then development of the photoresist, (2) selective transfer of pre-patterned masking material, and/or (3) direct formation of masks from computer controlled depositions of material.

Patterning operations may be used in selectively depositing material and/or may be used in the selective etching of material. Selectively etched regions may be selectively filled in or filled in via blanket deposition, or the like, with a different desired material. In some embodiments, the layer-by-layer build up may involve the simultaneous formation of portions of multiple layers. In some embodiments, depositions made in association with some layer levels may result in depositions to regions associated with other layer levels (i.e. regions that lie within the top and bottom boundary levels that define a different layer's geometric configuration). Such use of selective etching and interlaced material deposition in association with multiple layers is described in U.S. patent application Ser. No. 10/434,519, now U.S. Pat. No. 7,252,861, by Smalley, and entitled "Methods of and Apparatus for Electrochemically Fabricating Structures Via Interlaced Layers or Via Selective Etching and Filling of Voids layer elements" which is hereby incorporated herein by reference as if set forth in full.

Temporary substrates on which structures may be formed may be of the sacrificial-type (i.e. destroyed or damaged during separation of deposited materials to the extent they can not be reused), non-sacrificial-type (i.e. not destroyed or excessively damaged, i.e. not damaged to the extent they may not be reused, e.g. with a sacrificial or release layer located between the substrate and the initial layers of a structure that is formed). Non-sacrificial substrates may be considered reusable, with little or no rework (e.g. replanarizing one or more selected surfaces or applying a release layer, and the like) though they may or may not be reused for a variety of reasons.

DEFINITIONS

This section of the specification is intended to set forth definitions for a number of specific terms that may be useful in describing the subject matter of the various embodiments of the invention. It is believed that the meanings of most if not all of these terms is clear from their general use in the specification but they are set forth hereinafter to remove any ambiguity that may exist. It is intended that these definitions be used in understanding the scope and limits of any claims that use these specific terms. As far as interpretation of the claims of this patent disclosure are concerned, it is intended that these definitions take presence over any contradictory definitions or allusions found in any materials which are incorporated herein by reference.

"Build" as used herein refers, as a verb, to the process of building a desired structure or plurality of structures from a plurality of applied or deposited materials which are stacked and adhered upon application or deposition or, as a noun, to the physical structure or structures formed from such a process. Depending on the context in which the term is used, such physical structures may include a desired structure embedded within a sacrificial material or may include only desired physical structures which may be separated from one another or may require dicing and/or slicing to cause separation.

"Build axis" or "build orientation" is the axis or orientation that is substantially perpendicular to substantially planar levels of deposited or applied materials that are used in building up a structure. The planar levels of deposited or applied materials may be or may not be completely planar but are substantially so in that the overall extent of their cross-sectional dimensions are significantly greater than the height of any individual deposit or application of material (e.g. 100, 500, 1000, 5000, or more times greater). The planar nature of the deposited or applied materials may come about from use of a process that leads to planar deposits or it may result from a planarization process (e.g. a process that includes mechanical abrasion, e.g. lapping, fly cutting, grinding, or the like) that is used to remove material regions of excess height. Unless explicitly noted otherwise, "vertical" as used herein refers to the build axis or nominal build axis (if the layers are not stacking with perfect registration) while "horizontal" refers to a direction within the plane of the layers (i.e. the plane that is substantially perpendicular to the build axis).

"Build layer" or "layer of structure" as used herein does not refer to a deposit of a specific material but instead refers to a region of a build located between a lower boundary level and an upper boundary level which generally defines a single cross-section of a structure being formed or structures which are being formed in parallel. Depending on the details of the actual process used to form the structure, build layers are generally formed on and adhered to previously formed build layers. In some processes the boundaries between build layers are defined by planarization operations which result in successive build layers being formed on substantially planar upper surfaces of previously formed build layers. In some embodiments, the substantially planar upper surface of the preceding build layer may be textured to improve adhesion between the layers. In other build processes, openings may exist in or be formed in the upper surface of a previous but only partially formed build layers such that the openings in the previous build layers are filled with materials deposited in association with current build layers which will cause interlacing of build layers and material deposits. Such interlacing is described in U.S. patent application Ser. No. 10/434,519, now U.S. Pat. No. 7,252,861. This referenced application is incorporated herein by reference as if set forth in full. In most embodiments, a build layer includes at least one primary structural material and at least one primary sacrificial material. However, in some embodiments, two or more primary structural materials may used without a primary sacrificial material (e.g. when one primary structural material is a dielectric and the other is a conductive material). In some embodiments, build layers are distinguishable from each other by the source of the data that is used to yield patterns of the deposits, applications, and/or etchings of material that form the respective build layers. For example, data descriptive of a structure to be formed which is derived from data extracted from different vertical levels of a data representation of the structure define different build layers of the structure. The vertical separation of successive pairs of such descriptive data may define the thickness of build layers associated with the data. As used herein, at times, "build layer" may be loosely referred simply as "layer". In many embodiments, deposition thickness of primary structural or sacrificial materials (i.e. the thickness of any particular material after it is deposited) is generally greater than the layer thickness and a net deposit thickness is set via one or more planarization processes which may include, for example, mechanical abrasion (e.g. lapping, fly cutting, polishing, and the like) and/or chemical etching (e.g. using selective or non-selective etchants). The lower boundary and upper boundary for a build layer may be set and defined in different ways. From a design point of view they may be set based on a desired vertical resolution of the structure (which may vary with height). From a data manipulation point of view, the vertical layer boundaries may be defined as the vertical levels at which data descriptive of the structure is processed or the layer thickness may be defined as the height separating successive levels of cross-sectional data that dictate how the structure will be formed. From a fabrication point of view, depending on the exact fabrication process used, the upper and lower layer boundaries may be defined in a variety of different ways. For example by planarization levels or effective planarization levels (e.g. lapping levels, fly cutting levels, chemical mechanical polishing levels, mechanical polishing levels, vertical positions of structural and/or sacrificial materials after relatively uniform etch back following a mechanical or chemical mechanical planarization process). For example, by levels at which process steps or operations are repeated. At levels at which, at least theoretically, lateral extends of structural material can be changed to define new cross-sectional features of a structure.

"Layer thickness" is the height along the build axis between a lower boundary of a build layer and an upper boundary of that build layer.

"Planarization" is a process that tends to remove materials, above a desired plane, in a substantially non-selective manner such that all deposited materials are brought to a substantially common height or desired level (e.g. within 20%, 10%, 5%, or even 1% of a desired layer boundary level). For example, lapping removes material in a substantially non-selective manner though some amount of recession one material or another may occur (e.g. copper may recess relative to nickel). Planarization may occur primarily via mechanical means, e.g. lapping, grinding, fly cutting, milling, sanding, abrasive polishing, frictionally induced melting, other machining operations, or the like (i.e. mechanical planarization). Mechanical planarization maybe followed or proceeded by thermally induced planarization (.e.g. melting) or chemically induced planarization (e.g. etching). Planarization may occur primarily via a chemical and/or electrical means (e.g. chemical etching, electrochemical etching, or the like). Planarization may occur via a simultaneous combination of mechanical and chemical etching (e.g. chemical mechanical polishing (CMP)).

"Structural material" as used herein refers to a material that remains part of the structure when put into use.

"Supplemental structural material" as used herein refers to a material that forms part of the structure when the structure is put to use but is not added as part of the build layers but instead is added to a plurality of layers simultaneously (e.g. via one or more coating operations that applies the material, selectively or in a blanket fashion, to a one or more surfaces of a desired build structure that has been released from a sacrificial material.

"Primary structural material" as used herein is a structural material that forms part of a given build layer and which is typically deposited or applied during the formation of that build layer and which makes up more than 20% of the structural material volume of the given build layer. In some embodiments, the primary structural material may be the same on each of a plurality of build layers or it may be different on different build layers. In some embodiments, a given primary structural material may be formed from two or more materials by the alloying or diffusion of two or more materials to form a single material.

"Secondary structural material" as used herein is a structural material that forms part of a given build layer and is typically deposited or applied during the formation of the given build layer but is not a primary structural material as it individually accounts for only a small volume of the structural material associated with the given layer. A secondary structural material will account for less than 20% of the volume of the structural material associated with the given layer. In some preferred embodiments, each secondary structural material may account for less than 10%, 5%, or even 2% of the volume of the structural material associated with the given layer. Examples of secondary structural materials may include seed layer materials, adhesion layer materials, barrier layer materials (e.g. diffusion barrier material), and the like. These secondary structural materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Functional structural material" as used herein is a structural material that would have been removed as a sacrificial material but for its actual or effective encapsulation by other structural materials. Effective encapsulation refers, for example, to the inability of an etchant to attack the functional structural material due to inaccessibility that results from a very small area of exposure and/or due to an elongated or tortuous exposure path. For example, large (10,000 $\mu m^2$) but thin (e.g. less than 0.5 microns) regions of sacrificial copper sandwiched between deposits of nickel may define regions of functional structural material depending on ability of a release etchant to remove the sandwiched copper.

"Sacrificial material" is material that forms part of a build layer but is not a structural material. Sacrificial material on a given build layer is separated from structural material on that build layer after formation of that build layer is completed and more generally is removed from a plurality of layers after completion of the formation of the plurality of layers during a "release" process that removes the bulk of the sacrificial material or materials. In general sacrificial material is located on a build layer during the formation of one, two, or more subsequent build layers and is thereafter removed in a manner that does not lead to a planarized surface. Materials that are applied primarily for masking purposes, i.e. to allow subsequent selective deposition or etching of a material, e.g. photoresist that is used in forming a build layer but does not form part of the build layer) or that exist as part of a build for less than one or two complete build layer formation cycles are not considered sacrificial materials as the term is used herein but instead shall be referred as masking materials or as temporary materials. These separation processes are sometimes referred to as a release process and may or may not involve the separation of structural material from a build substrate. In many embodiments, sacrificial material within a given build layer is not removed until all build layers making up the three-dimensional structure have been formed. Of course sacrificial material may be, and typically is, removed from above the upper level of a current build layer during planarization operations during the formation of the current build layer. Sacrificial material is typically removed via a chemical etching operation but in some embodiments may be removed via a melting operation or electrochemical etching operation. In typical structures, the removal of the sacrificial material (i.e. release of the structural material from the sacrificial material) does not result in planarized surfaces but instead results in surfaces that are dictated by the boundaries of structural materials located on each build layer. Sacrificial materials are typically distinct from structural materials by having different properties therefrom (e.g. chemical etchability, hardness, melting point, etc.) but in some cases, as noted previously, what would have been a sacrificial material may become a structural material by its actual or effective encapsulation by other structural materials. Similarly, structural materials may be used to form sacrificial structures that are separated from a desired structure during a release process via the sacrificial structures being only attached to sacrificial material or potentially by dissolution of the sacrificial structures themselves using a process that is insufficient to reach structural material that is intended to form part of a desired structure. It should be understood that in some embodiments, small amounts of structural material may be removed, after or during release of sacrificial material. Such small amounts of structural material may have been inadvertently formed due to imperfections in the fabrication process or may result from the proper application of the process but may result in features that are less than optimal (e.g. layers with stairs steps in regions where smooth sloped surfaces are desired. In such cases the volume of structural material removed is typically minuscule compared to the amount that is retained and thus such removal is ignored when labeling materials as sacrificial or structural. Sacrificial materials are typically removed by a dissolution process, or the like, that destroys the geometric configuration of the sacrificial material as it existed on the build layers. In many embodiments, the sacrificial material is a conductive material such as a metal. As will be discussed hereafter, masking materials though typically sacrificial in nature are not termed sacrificial materials herein unless they meet the required definition of sacrificial material.

"Supplemental sacrificial material" as used herein refers to a material that does not form part of the structure when the structure is put to use and is not added as part of the build layers but instead is added to a plurality of layers simultaneously (e.g. via one or more coating operations that applies the material, selectively or in a blanket fashion, to a one or more surfaces of a desired build structure that has been released from an initial sacrificial material. This supplemental sacrificial material will remain in place for a period of time and/or during the performance of certain post layer formation operations, e.g. to protect the structure that was released from a primary sacrificial material, but will be removed prior to putting the structure to use.

"Primary sacrificial material" as used herein is a sacrificial material that is located on a given build layer and which is typically deposited or applied during the formation of that build layer and which makes up more than 20% of the sacrificial material volume of the given build layer. In some embodiments, the primary sacrificial material may be the same on each of a plurality of build layers or may be different on different build layers. In some embodiments, a given primary sacrificial material may be formed from two or more materials by the alloying or diffusion of two or more materials to form a single material.

"Secondary sacrificial material" as used herein is a sacrificial material that is located on a given build layer and is typically deposited or applied during the formation of the build layer but is not a primary sacrificial materials as it individually accounts for only a small volume of the sacrificial material associated with the given layer. A secondary sacrificial material will account for less than 20% of the volume of the sacrificial material associated with the given layer. In some preferred embodiments, each secondary sacrificial material may account for less than 10%, 5%, or even 2% of the volume of the sacrificial material associated with the given layer. Examples of secondary structural materials may include seed layer materials, adhesion layer materials, barrier layer materials (e.g. diffusion barrier material), and the like. These secondary sacrificial materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No.

7,195,989. These referenced applications are incorporated herein by reference as if set forth in full herein.

"Adhesion layer", "seed layer", "barrier layer", and the like refer to coatings of material that are thin in comparison to the layer thickness and thus generally form secondary structural material portions or sacrificial material portions of some layers. Such coatings may be applied uniformly over a previously formed build layer, they may be applied over a portion of a previously formed build layer and over patterned structural or sacrificial material existing on a current (i.e. partially formed) build layer so that a non-planar seed layer results, or they may be selectively applied to only certain locations on a previously formed build layer. In the event such coatings are non-selectively applied, selected portions may be removed (1) prior to depositing either a sacrificial material or structural material as part of a current layer or (2) prior to beginning formation of the next layer or they may remain in place through the layer build up process and then etched away after formation of a plurality of build layers.

"Masking material" is a material that may be used as a tool in the process of forming a build layer but does not form part of that build layer. Masking material is typically a photopolymer or photoresist material or other material that may be readily patterned. Masking material is typically a dielectric. Masking material, though typically sacrificial in nature, is not a sacrificial material as the term is used herein. Masking material is typically applied to a surface during the formation of a build layer for the purpose of allowing selective deposition, etching, or other treatment and is removed either during the process of forming that build layer or immediately after the formation of that build layer.

"Multilayer structures" are structures formed from multiple build layers of deposited or applied materials.

"Multilayer three-dimensional (or 3D or 3-D) structures" are Multilayer Structures that meet at least one of two criteria: (1) the structural material portion of at least two layers of which one has structural material portions that do not overlap structural material portions of the other.

"Complex multilayer three-dimensional (or 3D or 3-D) structures" are multilayer three-dimensional structures formed from at least three layers where a line may be defined that hypothetically extends vertically through at least some portion of the build layers of the structure will extend from structural material through sacrificial material and back through structural material or will extend from sacrificial material through structural material and back through sacrificial material (these might be termed vertically complex multilayer three-dimensional structures). Alternatively, complex multilayer three-dimensional structures may be defined as multilayer three-dimensional structures formed from at least two layers where a line may be defined that hypothetically extends horizontally through at least some portion of a build layer of the structure that will extend from structural material through sacrificial material and back through structural material or will extend from sacrificial material through structural material and back through sacrificial material (these might be termed horizontally complex multilayer three-dimensional structures). Worded another way, in complex multilayer three-dimensional structures, a vertically or horizontally extending hypothetical line will extend from one or structural material or void (when the sacrificial material is removed) to the other of void or structural material and then back to structural material or void as the line is traversed along at least a portion of the line.

"Moderately complex multilayer three-dimensional (or 3D or 3-D) structures are complex multilayer 3D structures for which the alternating of void and structure or structure and void not only exists along one of a vertically or horizontally extending line but along lines extending both vertically and horizontally.

"Highly complex multilayer (or 3D or 3-D) structures are complex multilayer 3D structures for which the structure-to-void-to-structure or void-to-structure-to-void alternating occurs once along the line but occurs a plurality of times along a definable horizontally or vertically extending line.

"Up-facing feature" is an element dictated by the cross-sectional data for a given build layer "n" and a next build layer "n+1" that is to be formed from a given material that exists on the build layer "n" but does not exist on the immediately succeeding build layer "n+1". For convenience the term "up-facing feature" will apply to such features regardless of the build orientation.

"Down-facing feature" is an element dictated by the cross-sectional data for a given build layer "n" and a preceding build layer "n−1" that is to be formed from a given material that exists on build layer "n" but does not exist on the immediately preceding build layer "n−1". As with up-facing features, the term "down-facing feature" shall apply to such features regardless of the actual build orientation.

"Continuing region" is the portion of a given build layer "n" that is dictated by the cross-sectional data for the given build layer "n", a next build layer "n+1" and a preceding build layer "n−1" that is neither up-facing nor down-facing for the build layer "n".

"Minimum feature size" refers to a necessary or desirable spacing between structural material elements on a given layer that are to remain distinct in the final device configuration. If the minimum feature size is not maintained on a given layer, the fabrication process may result in structural material inadvertently bridging the two structural elements due to masking material failure or failure to appropriately fill voids with sacrificial material during formation of the given layer such that during formation of a subsequent layer structural material inadvertently fills the void. More care during fabrication can lead to a reduction in minimum feature size or a willingness to accept greater losses in productivity can result in a decrease in the minimum feature size. However, during fabrication for a given set of process parameters, inspection diligence, and yield (successful level of production) a minimum design feature size is set in one way or another. The above described minimum feature size may more appropriately be termed minimum feature size of sacrificial material regions. Conversely a minimum feature size for structure material regions (minimum width or length of structural material elements) may be specified. Depending on the fabrication method and order of deposition of structural material and sacrificial material, the two types of minimum feature sizes may be different. In practice, for example, using electrochemical fabrication methods and described herein, the minimum features size on a given layer may be roughly set to a value that approximates the layer thickness used to form the layer and it may be considered the same for both structural and sacrificial material widths and lengths. In some more rigorously implemented processes, examination regiments, and rework requirements, it may be set to an amount that is 80%, 50%, or even 30% of the layer thickness. Other values or methods of setting minimum feature sizes may be set.

"Sublayer" as used herein refers to a portion of a build layer that typically includes the full lateral extents of that build layer but only a portion of its height. A sublayer is usually a vertical portion of build layer that undergoes independent processing compared to another sublayer of that build layer.

Assembly/Formation of Multi-Element Structures

A first embodiment of the invention provides for the joining of two or more structures via elastic deformation and retention wherein at least two the structures remain moveable (with at least one degree of freedom with respect to one another while still remaining joined together. In some variations of the embodiment, all elements are formed via a multi-material multi-layer fabrication processes (e.g. electrochemical fabrication process) while in other variations one or more, but not all the elements are formed via some other process or processes.

FIGS. 5A-5F provide various views of a first embodiment of the invention as applied to a particular device. The various views show separate or multiple elements of a three element structure that are joined by elastically deforming portions of the first and third elements around a second element wherein the three elements become joined to one another by the elastic reformation of the first and third structures as portions of the second structure become retained by retention regions of the first and third elements.

Figure 5A:
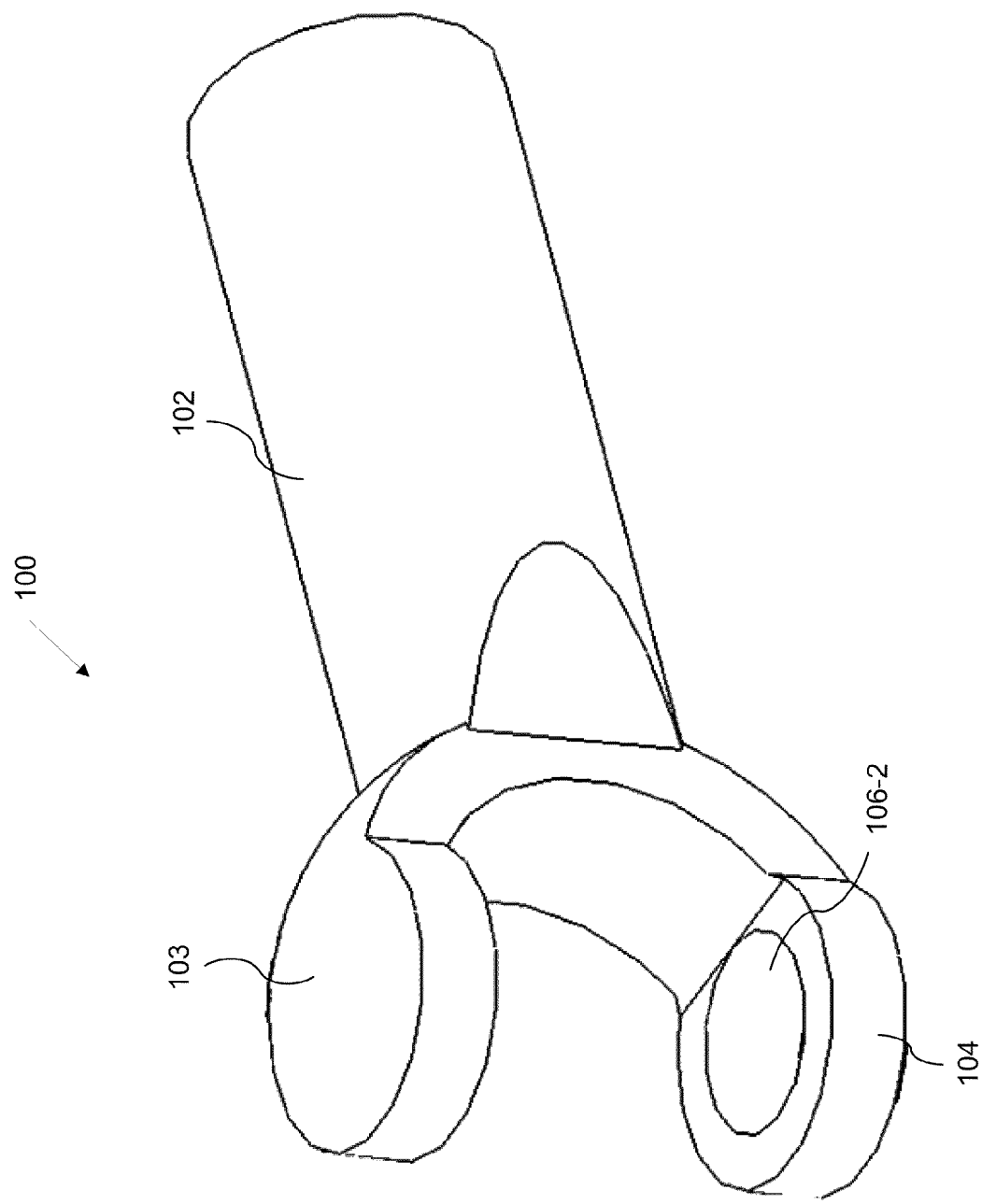
FIGS. 5A-5F provide various views of a first embodiment and in particular various views of separate or multiple elements of a three element structure that is joined by elastically deforming portions of the first and third elements around a second element wherein the three elements become joined to one another by the elastic reformation of the first and third structures as portions of the second structure become retained by retention regions of the first and third elements.

FIG. 5A provides a perspective view of a first structural element 100 that may be formed in a multi-layer process having a shaft 102 and a yoke defined by arms 103 and 104 with the yoke including recessed portions 106-1 and 106-2 in arms 103 and 104 respectively (only region 106-1 is visible) that define a retention region.

Figure 5B:
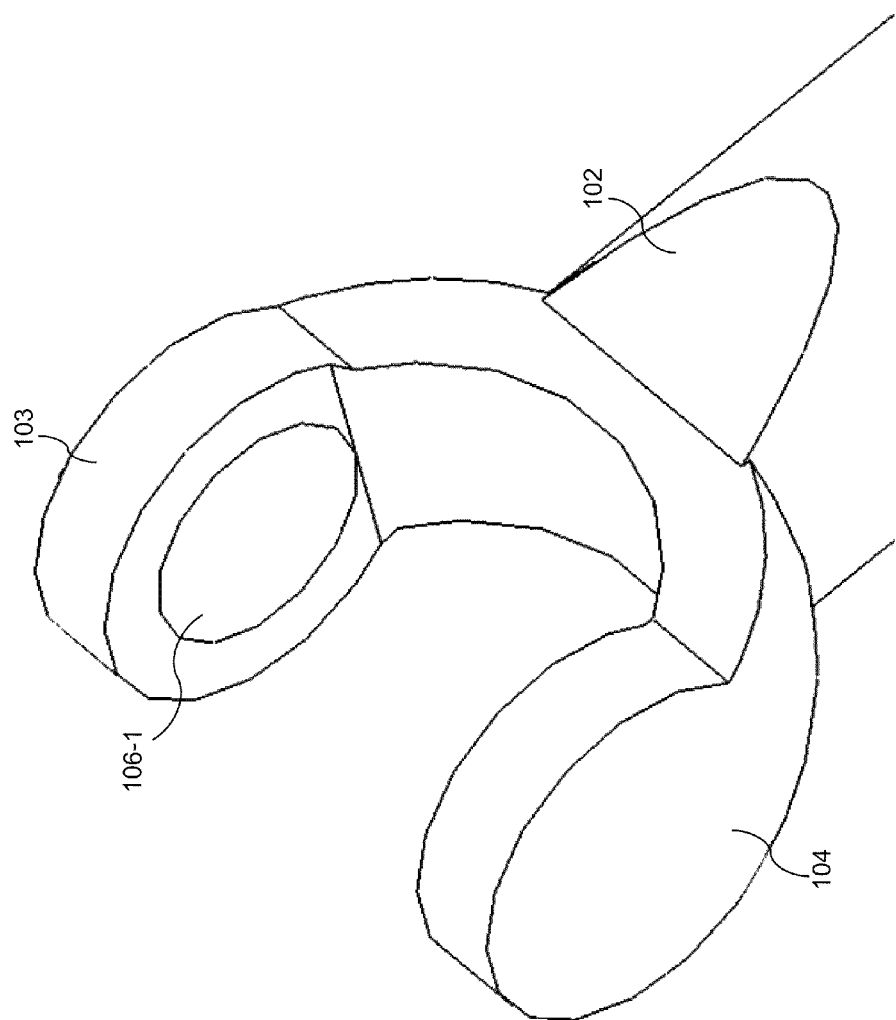
Figure 5C:
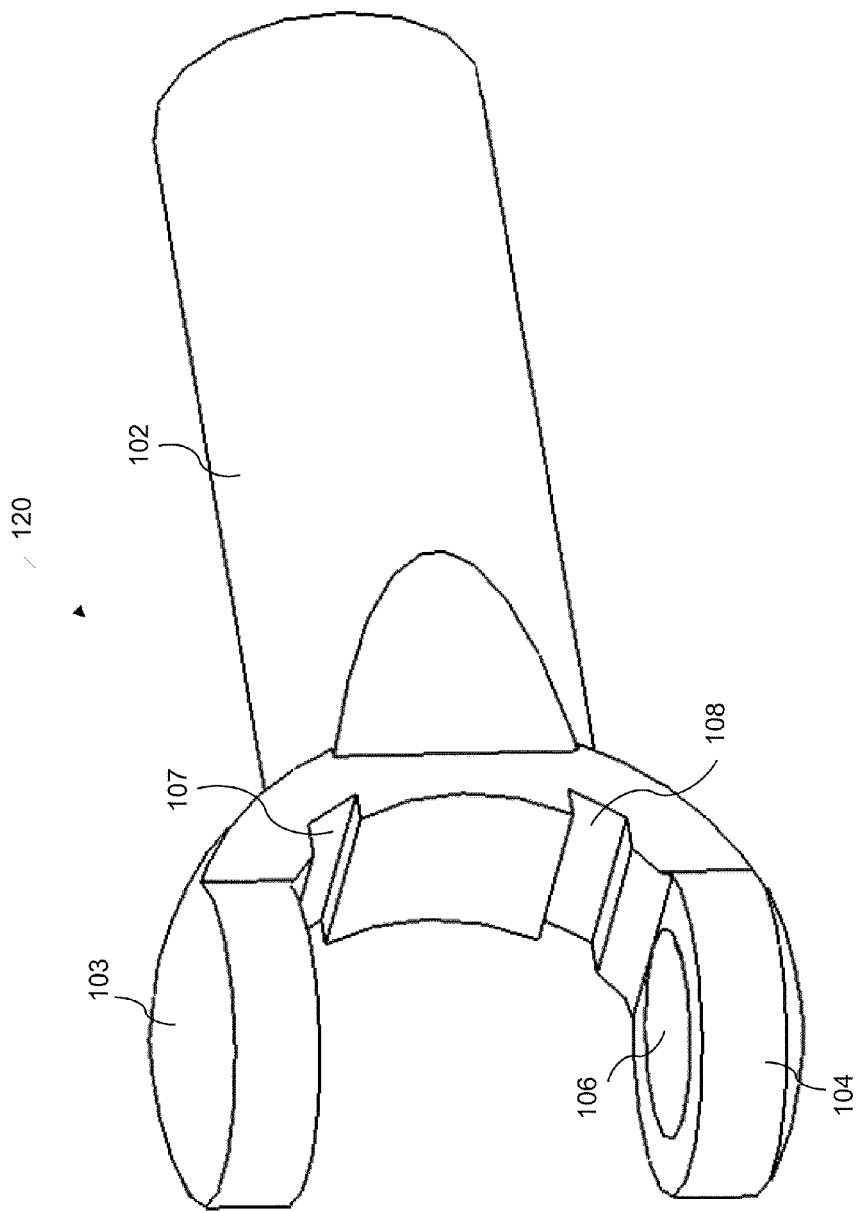
Figure 5D:
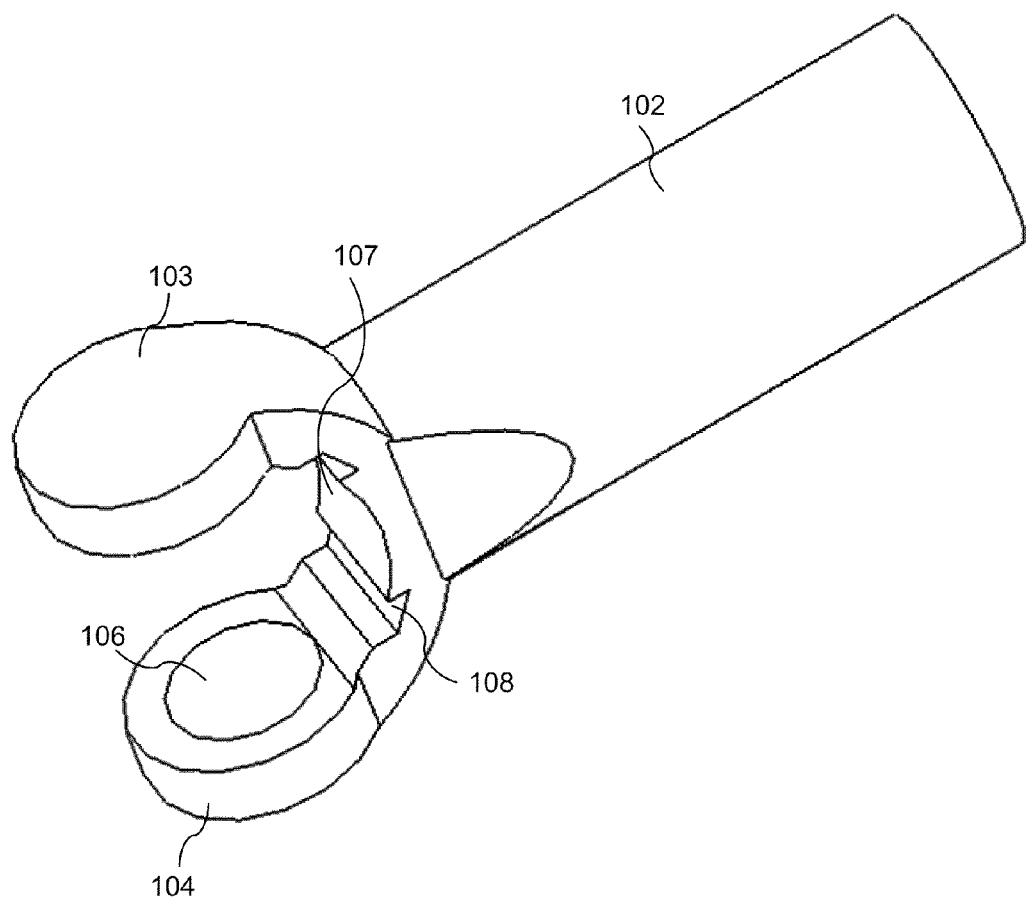

FIG. 5B provides a close up perspective view of the structure of FIG. 5A showing the recess 106-1 located in the top arm 103 of the yoke as compared to the recess 106-1 in the bottom arm 104 of the yoke as shown in FIG. 5A FIGS. 5C and 5D provide a perspective views of a first structural element 120 that has an alternative configuration compared to that of FIGS. 5A and 5B where notches 107 and 108 are included in the top and bottom arms 103 and 104, respectively of the yoke to allow a reduction in stiffness of the structural element to allow more compliance for the purpose of joining the element 120 to another structural element.

Figure 5E:
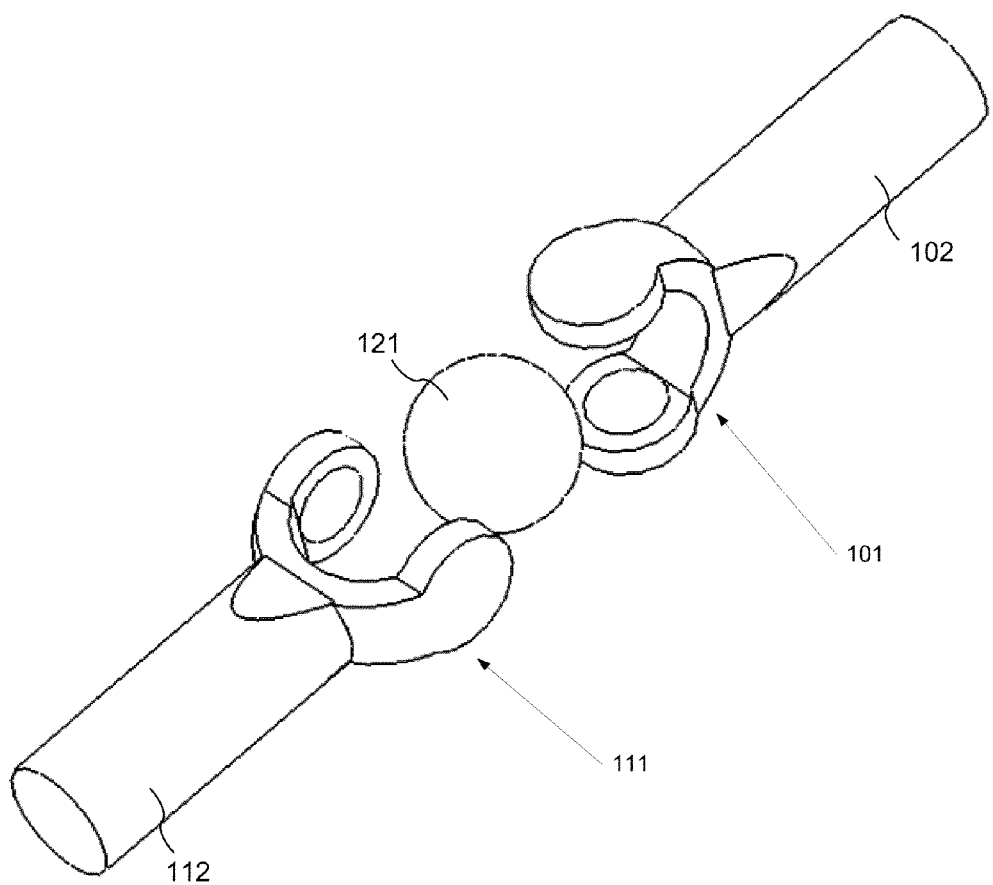

FIG. 5E provides a perspective view of first structural element 111 (which is equivalent to 100 of FIG. 5A), second element 121, and third structural element 101 (which is also equivalent element 100 of FIG. 5A) in relative positions just prior to joining of the first and second elements and the second and third elements, wherein the first structural element 111 is on the lower left side of the figure, the second structural element is in the form of a ball 121, while the third structural element 101 is on the upper right side of the figure. In some embodiments, all three elements may be formed from a plurality of adhered layers while in other embodiments, only the left and right elements may be formed from a plurality of adhered layers while the second element is formed as a smooth spherical element in any desired process.

Figure 5F:
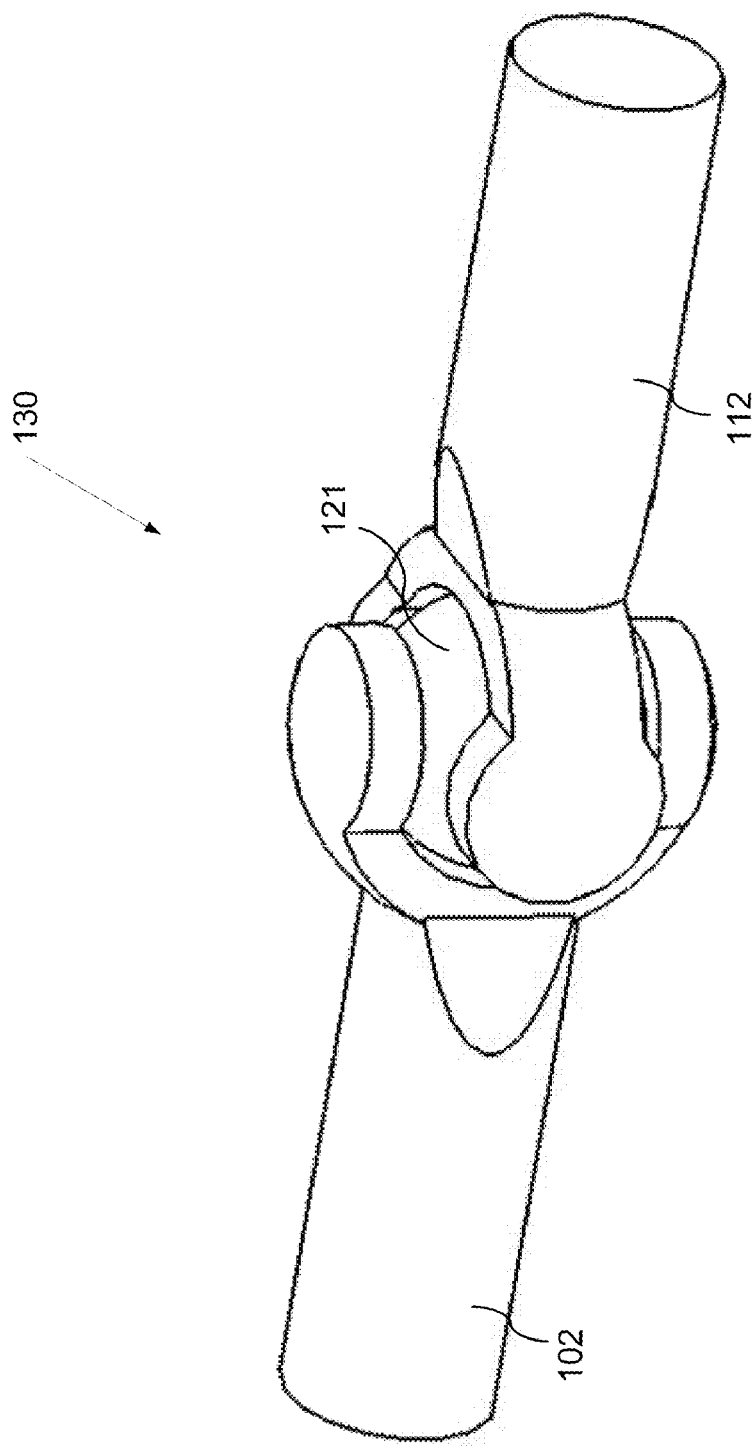

FIG. 5F shows the three elements of FIG. 5E after joining via elastic deformation of the first and third elements around the spherical surface of the ball to form an assembly 130 wherein the curved surface of the ball fits into the recesses in the yokes of the first and third elements and is held in place via the reformation of the shapes of the first and third elements after initial elastic deformation.

A second embodiment of the invention provides for the joining of two or more structures via elastic deformation and retention wherein at least two the structures become locked together in fixed positions respect to one another. In some variations of the embodiment, all elements are formed via a multi-material multi-layer fabrication processes (e.g. electrochemical fabrication processes) while in other variations one or more, but not all the elements are formed via some other process or processes.

FIGS. 6A-6H provide various views of a second embodiment of the invention as applied to a particular device. The various views show separate or multiple elements of a three plus (i.e. minimum of three elements but can be up to five elements as illustrated). element structure that is joined by elastically deforming portions of the top and bottom elements around one or more intermediate elements wherein the elements become joined to one another by the elastic reformation of the top and bottom structures as portions of the second structure become retained by retention regions of the top and bottom elements or structures.

Figure 6A:
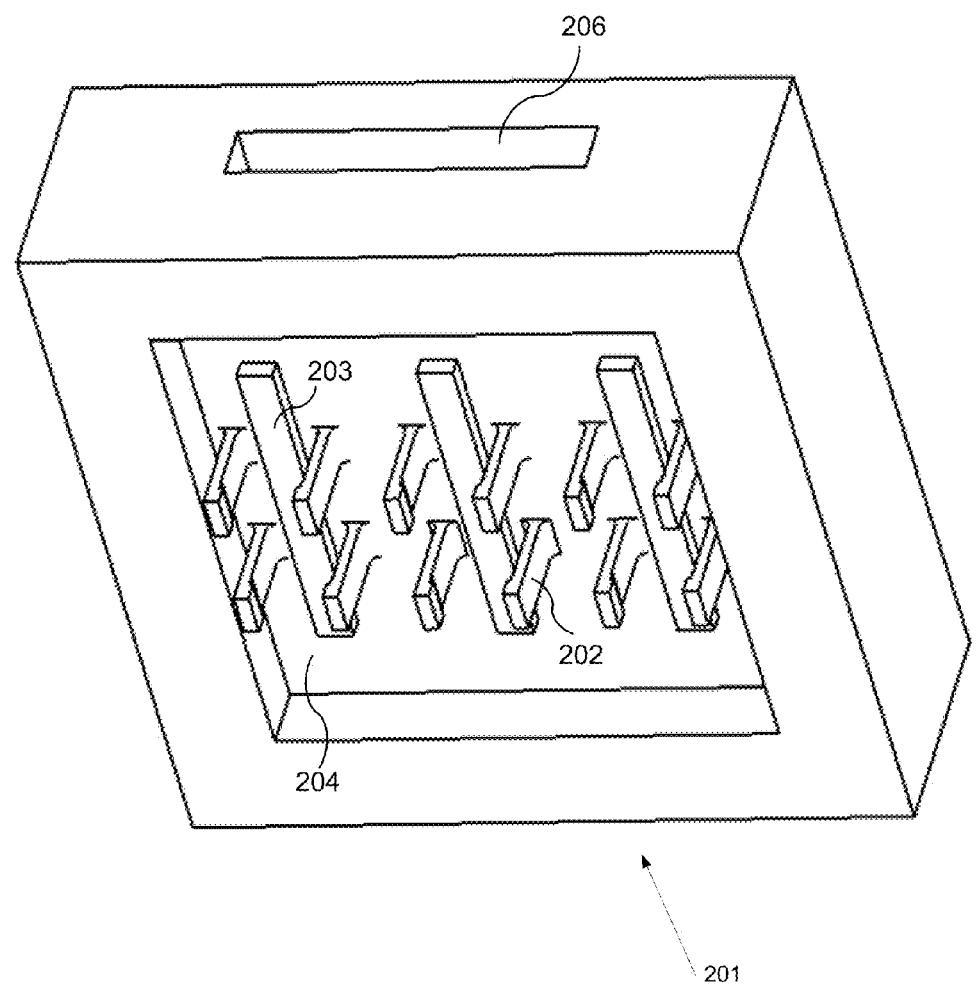
FIGS. 6A-6H provide various views of a second embodiment and in particular various views of separate or multiple elements of a three plus element structure that is joined by elastically deforming portions of the first and third elements around one or more second elements wherein the elements become joined to one another by the elastic reformation of the first and third structures as portions of the second structure(s) become retained by retention regions of the first and third elements.

FIG. 6A provides a perspective view of a first, or bottom, structural element 201 that may be formed in a multi-layer multi-material fabrication process, wherein the structure is in the form of a lower block having a cavity 204 from which six pairs of elastic or snap retention features 202 protrude and which are located in three rows.

Figure 6B:
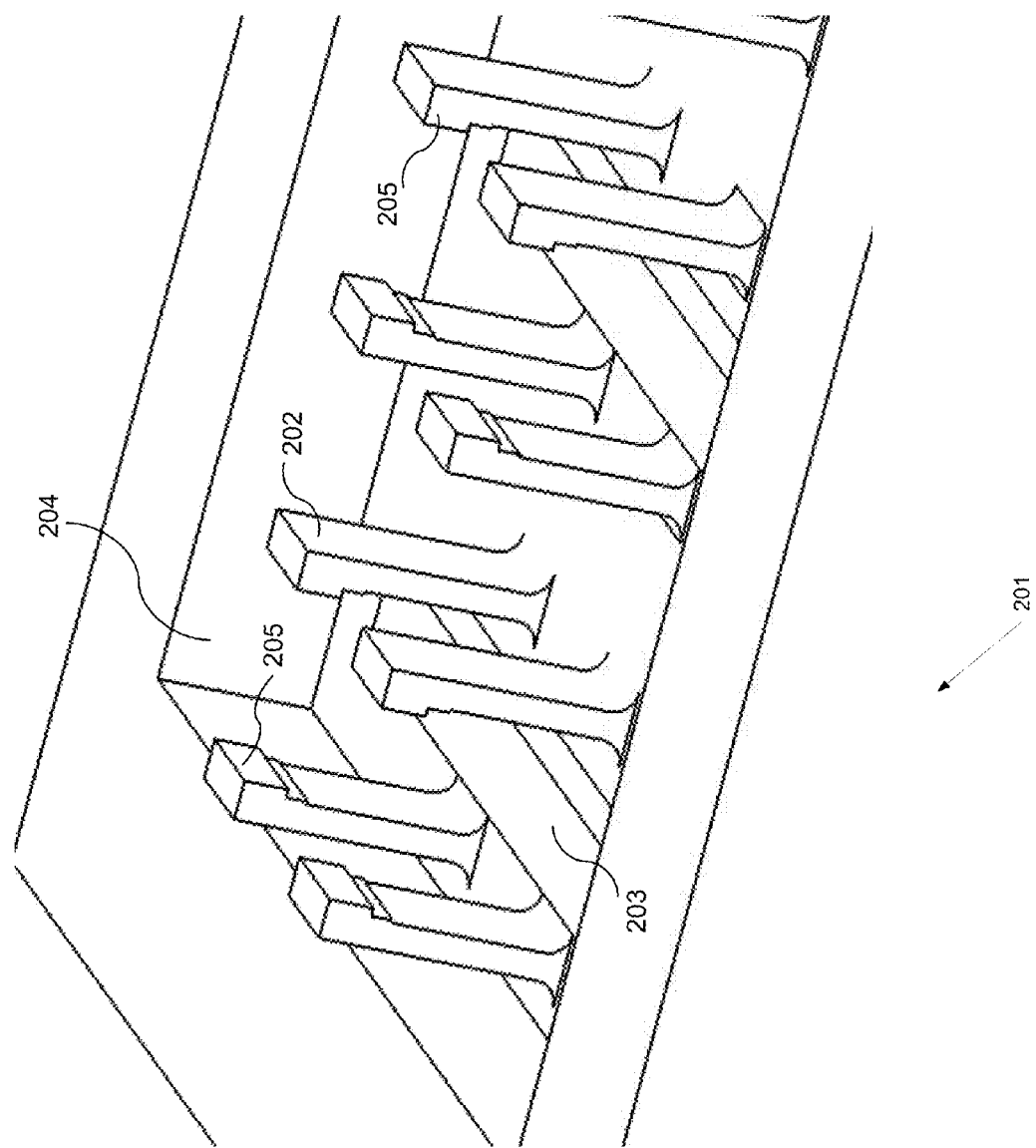

FIG. 6B provides a close up perspective views of the retention features 202 of the lower block structure 201 of FIG. 6A showing that the ends of the retention features which are distal from the bottom of the cavity include protrusions 205 that can engage a depression or other feature of a second element thus allowing the locking of the first and second elements together. FIG. 6B also shows spacing bars 203 that set a desired height for seating the second element(s) when joining is to occur.

Figure 6C:
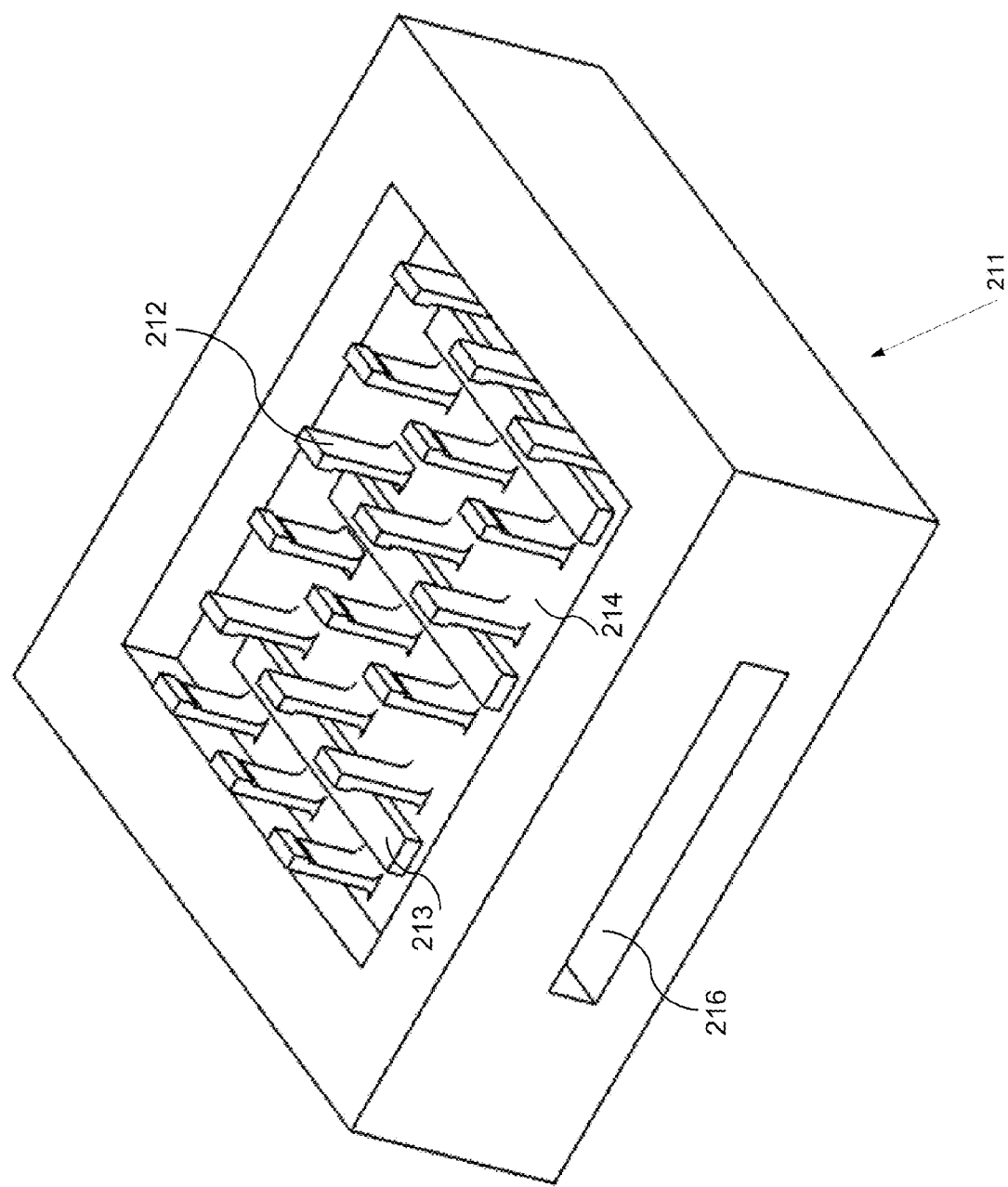

FIG. 6C provides a perspective view of a third, or top, structural element 211 that may be formed in a multi-material, multi-layer fabrication process, wherein the structure is in the form of an upper block having a cavity 214 from which nine pairs of elastic or snap retention features 212 protrude and which are located in three rows. The third structural element 211 may be mated to the first structural element 201 via a second structural element that can be grabbed by the retention arms of each of the first and third elements. In different embodiments the retention features of the first and third elements may take on different shapes. For example, they may be in line and face each other and thus may be made to engage directly with each other thus obviating the need for a second or intermediation element. FIG. 6C also shows spacing bars 213 within cavity 214 that set a desired height for seating the second, or intermediate, element(s) when joining is to occur.

Figure 6D:
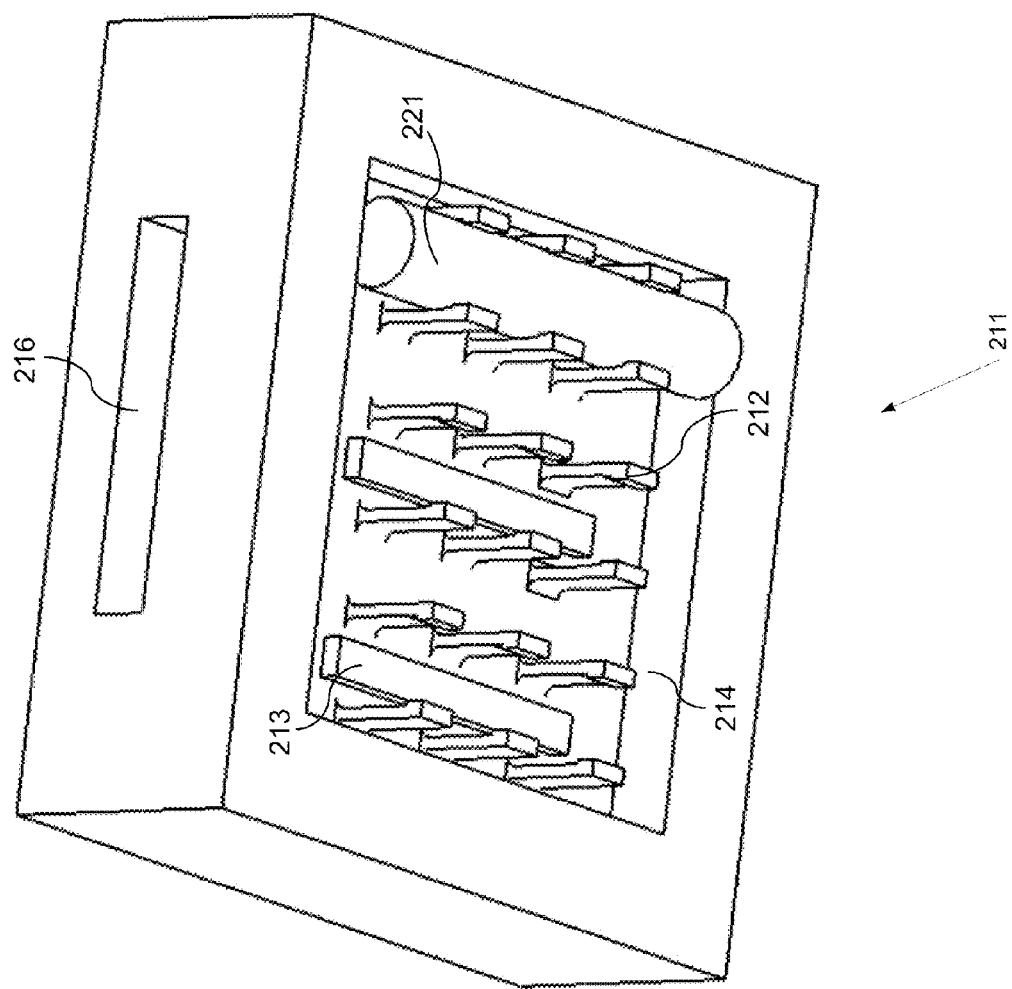

FIG. 6D shows a second element, in the form of a cylindrical rod 221 or pin engaged with the three pair of retention features 212 of the upper block 211 while the two additional rows of retention features have not received corresponding second elements.

Figure 6E:
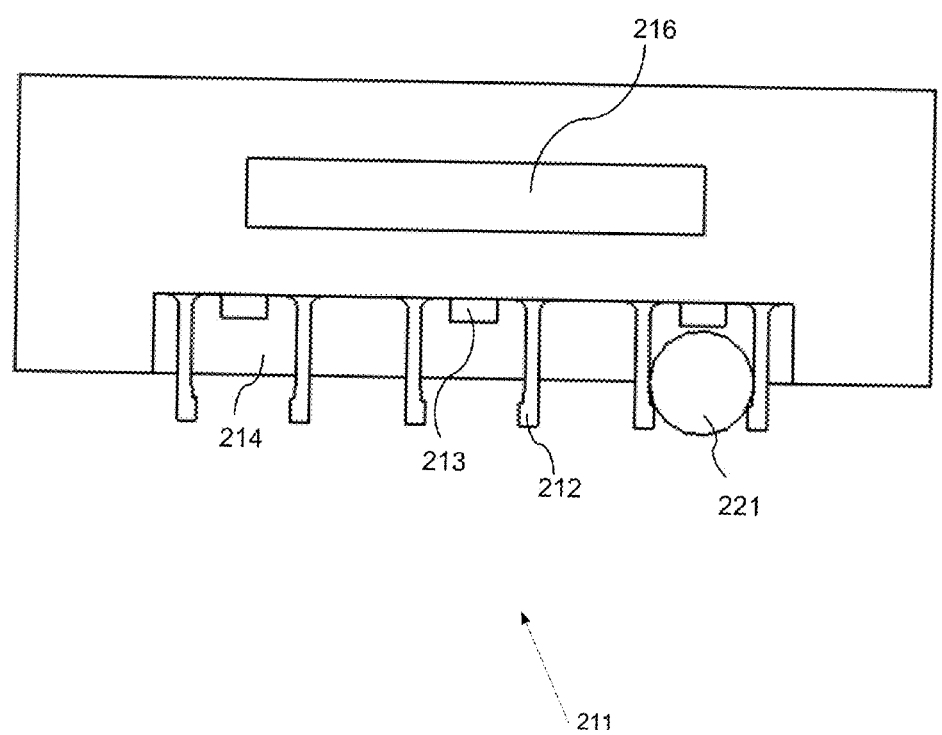

FIG. 6E provides a side cut view of the third, or upper, element and a single second element showing how the retention features of the third element engage the second element 221.

Figure 6F:
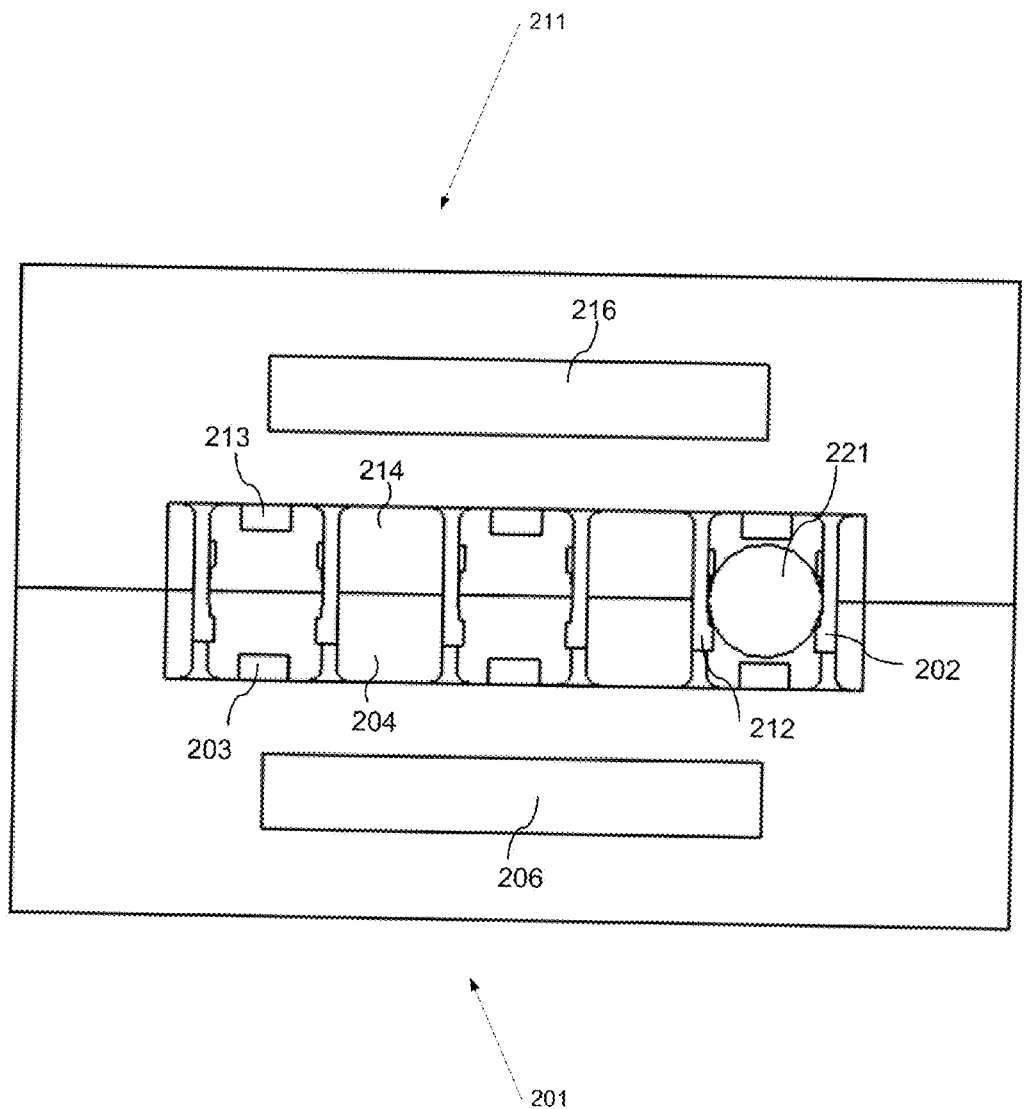
Figure 6G:
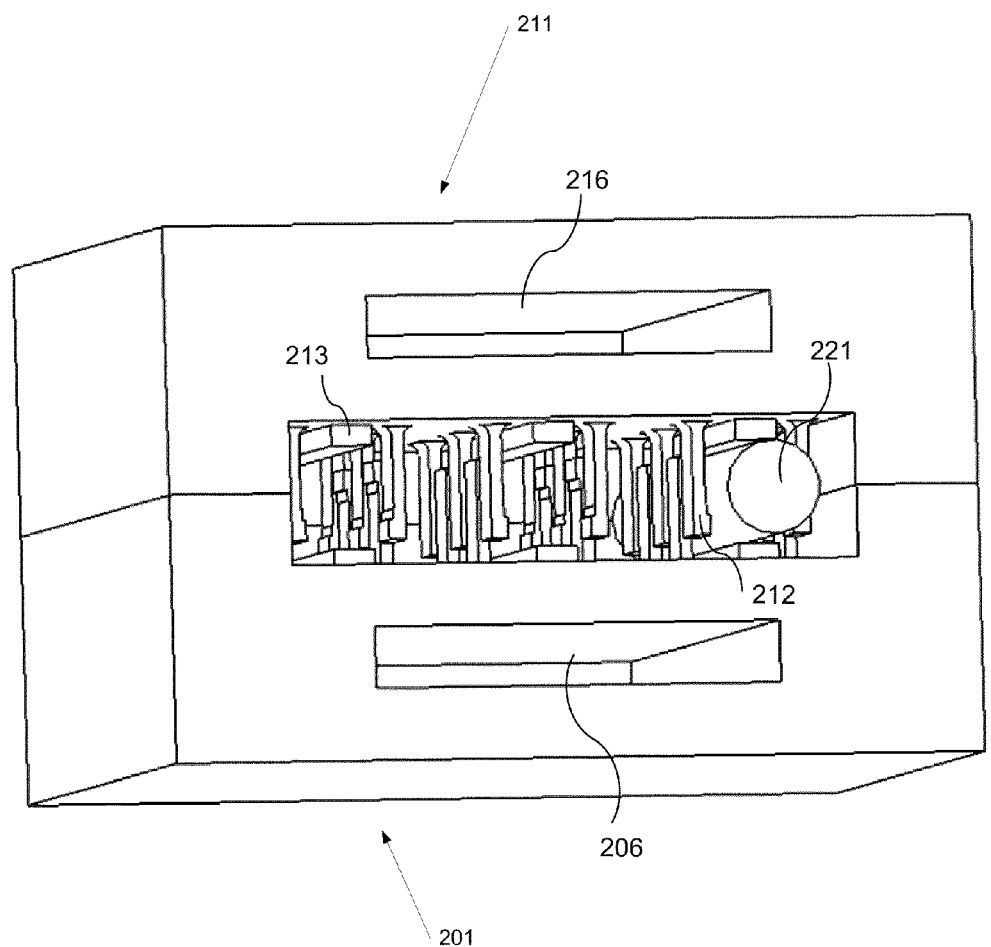

FIGS. 6F and 6G provide a side cut view and a perspective view, respectively, of the first element 201 and third element 211 joined via a single second element 221 showing how the retention features 202 and 212 of the first and third elements engage the second element.

Figure 6H:
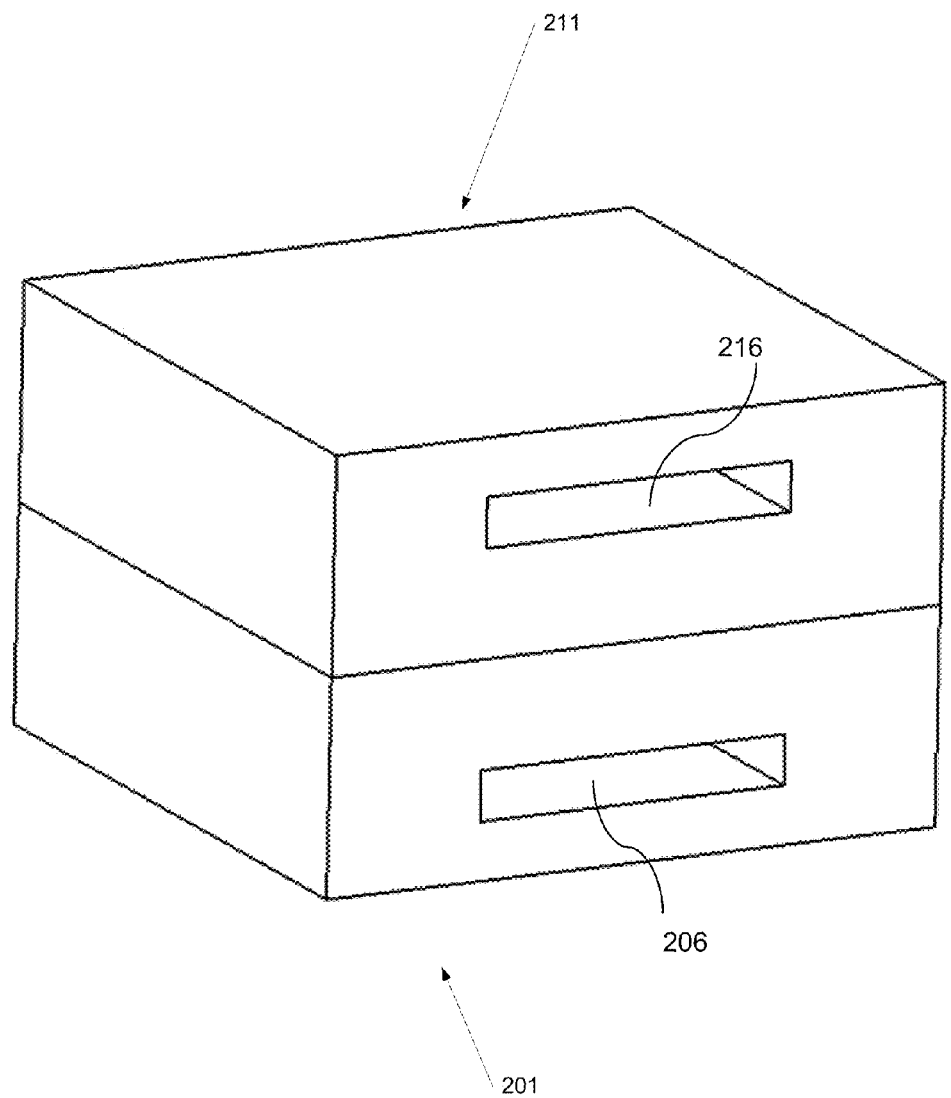

FIG. 6H provides a perspective view of the first element 201 and third element 211 joined via one or more second elements (not visible). It is noted that the various FIGS. 6A-6H show the first and third elements including optional slots 216 for engaging a tool that may be used to separate the first and third blocks if it should be desirable to do so. Such separation may occur for testing purposes (e.g. joining strength) or simply for releasing the structures when desired.

It is noted that the first and third structures of FIGS. 5A-5E remain movable relative to each other while joined whereas the first and third structures of FIGS. 6A-6H become immovable relative to each other once engaged. In both embodiments, the intermediate or second element or elements may be made in a non-layered manner so that they would have desirable and smooth surface features. In both embodiments, the first and third structures were joined by an intermediate element. In both embodiments, joining is achieved via forced elastic deflection of at least a portion of one of the elements relative to the other element and retention occurs via the at least partial elastic reformation of the deformed element upon appropriate engagement with contours or depressions in at least one element relative to engagement/protrusion features on the other element and by the strength of the reformed structure to resist sufficient deformation during subsequent use of the joined structures.

Various alternatives to the first and second embodiments are possible. In these other embodiments, the joined structures may take on completely different configurations and be used for different purposes. In some embodiments, the joined structures may be formed from only two elements or be joined in a series of more than three elements. In some alternative embodiments, all joined elements may be formed in a multilayer process while in other embodiments only one element may be formed in a multilayer process. In some embodiments, the second element may be formed in a multilayer process and may be oriented during formation to provide smooth surfaces along critical axes while stair steps are formed along less critical surfaces. In some embodiments, elements formed in a multilayer process may undergo discontinuity reduction (i.e. stair-step reduction) processing such as that taught in U.S. application Ser. No. 10/830,262 as referenced hereafter.

In still other embodiments, joining may occur without initial deformation by retention elements already being in a deformed state while retention occurs via subsequent plastic and/or elastic deformation of the retention elements into retention positions. Plastic deformation may occur via an appropriate tool with sufficient over travel to allow retention in the presence of any spring back that occurs after plastic deformation. Any elastic deformation required to retain the elements in their joined positions may occur by various mechanical features (e.g. slides, pivots, and or mechanical stops, wedges, locks, etc. that can be brought into position to lock the retention features in their required positions.

In still other embodiments, elastic deformation may be used for joining and there after mechanical features or other elements may be brought into position to enhance the effective mechanical strength of the retention elements to ensure the features stay engaged during desired use. In such embodiments, the retention features may be more compliant than required for retention to make loading easier and thereafter, the effective stiffness of the elements may be increased by moving into place separate elements or features of the element or elements to provide the required retention force or stiffness.

In still other embodiments, loading of elements into desired retention positions may occur via paths that require no elastic deformation or little elastic deformation wherein the loading paths are configured or oriented in such a manner or blocked after loading so that during use the engaged portion of the elements remain in their engaged positions.

Figure 7A:
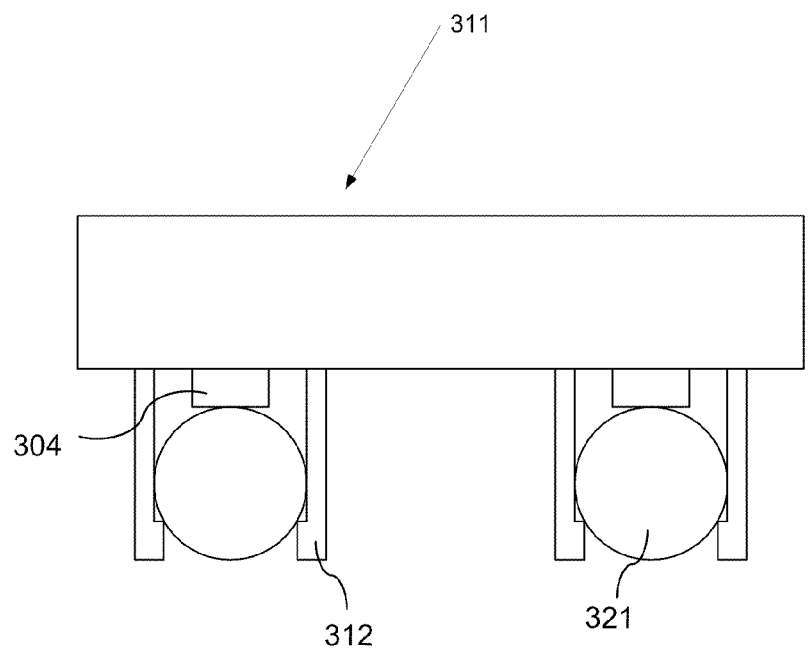
FIGS. 7A-7C illustrate various stages in a process for creating a structure having electrically or thermally isolated regions or elements according to a third embodiment of the invention.
Figure 7B:
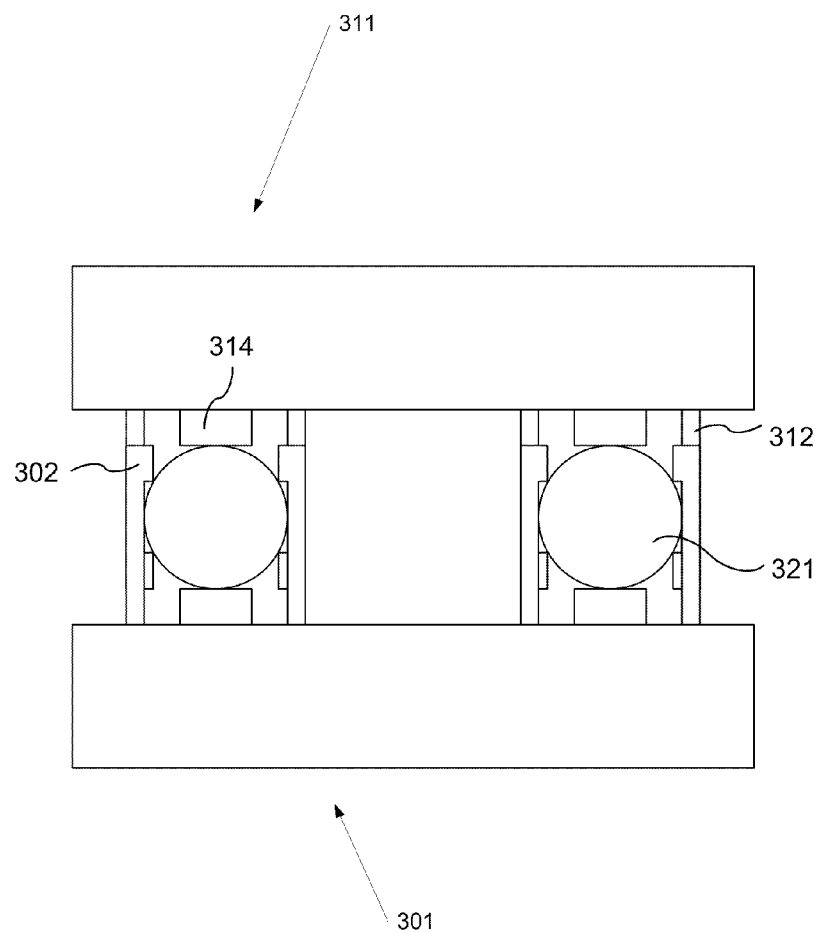
Figure 7C:
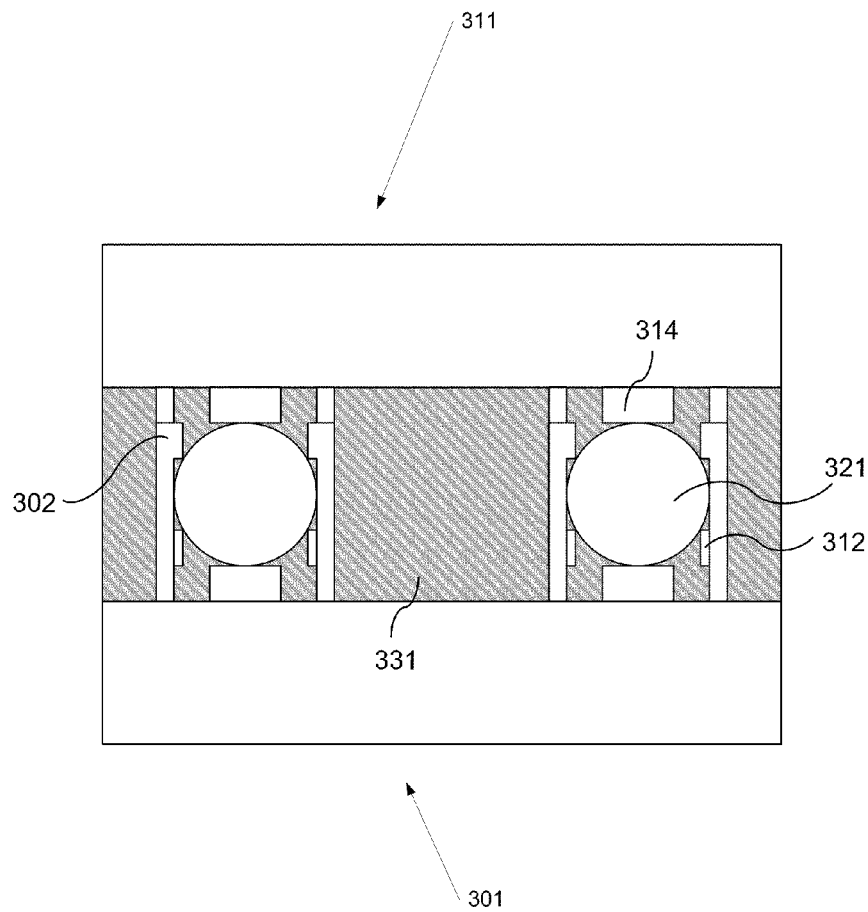

A third embodiment of the invention provides for the formation of structures having electrically or thermally isolated regions. FIGS. 7A-7C illustrate various stages in a process as applied to a particular structure/assembly for creating a structure having electrically or thermally isolated regions or elements according to the third embodiment.

FIG. 7A shows a first element 311 in the form of an upper block like that of FIGS. 6A-6H joined to a pair of second cylindrical elements 321 (similar to that of FIGS. 6A-6H) via retention features 312 and stops or seats 304 wherein the cylindrical or pin element is formed from a dielectric material (e.g. ceramic, glass, polymer, or the like).

FIG. 7B shows the state of the process after a third element 301 is joined to the first and second elements but where the third element only makes contact with the second element2 321 and not the first element 311 (under the assumption the first and third elements are electrically or thermally more conductive than the second element) thus allowing the first and third elements to be joined while maintaining electrical and/or thermal isolation.

FIG. 7C shows the state of the process after an optional non-thermally and/or non-electrically conductive filler material 331 is added between the first and third structures to provide additional strength and or positioning control.

In some alternatives embodiments, the retention elements 312 may not only include retention protrusions may also include protrusions or the like that limit how far the engagement of the second structure on the first structure is allowed to proceed (such added features may be in addition to or in replacement of the pin rests or seats 203 and 314 shown in FIGS. 6A-7C.

In still other variations of the above noted embodiments, individual structures or elements may be joined to one another during formation via permanent or removable linkages such that they may remain together prior to elastically joining or even be retained together with proper orientation prior to joining. The un-joined but linked structures may be translated, rotated, folded into joined positions with each other or with other elements or structures that may not have been initially linked. After elastically joining the elements, the linkage elements may remain or be removed. Additional teachings about joining linked but un-joined elements is provided in U.S. patent application Ser. No. 11/506,586 which is a parent to the present application and has previously been incorporated herein by reference. Further teachings concerning the joining of structures may also be found in U.S. patent application Ser. Nos. 11/435,809, 10/434,103, and 10/677,556 which are each parents of the present application and which have been previously incorporated herein by reference.

FIGS. 8A-8D provide perspective and plan views of layered versions of the left and right elements of FIGS. 5C and 5D as the left and right elements of FIGS. 5C and 5D might be formed from a plurality of adhered layers wherein the axis (i.e. the z-axis) of stacking of the layers is perpendicular to the longitudinal axis (i.e. the y-axis) of the device and also perpendicular to the faces (i.e. facing along the negative and positive x-axis) of the retention arms of the elements.

FIGS. 8E-8H provide perspective and plan views of layered versions of the left and right elements of FIGS. 5C and 5D as the left and right elements of FIGS. 5E and 5F might be formed from a plurality of adhered layers wherein the axis of stacking of the layers (i.e. the y-axis) is perpendicular to the longitudinal axis (i.e. the x-axis) of the device and is parallel to the faces of the retention arms of the elements.

Figure 8B:
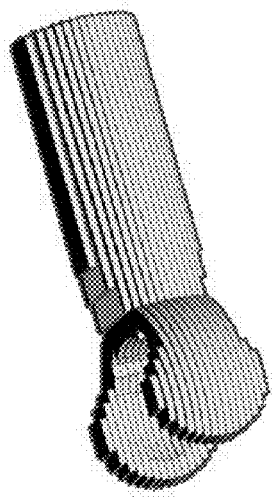
FIGS. 8A-8D provide perspective and plan views of layered versions of the left and right elements of FIGS. 5C and 5D as the left and right elements of FIGS. 5C and 5D might be formed from a plurality of adhered layers wherein the axis (i.e. the z-axis) of stacking of the layers is perpendicular to the longitudinal axis (i.e. the y-axis) of the device and also perpendicular to the faces (i.e. facing along the negative and positive x-axis) of the retention arms of the elements.
Figure 8A:
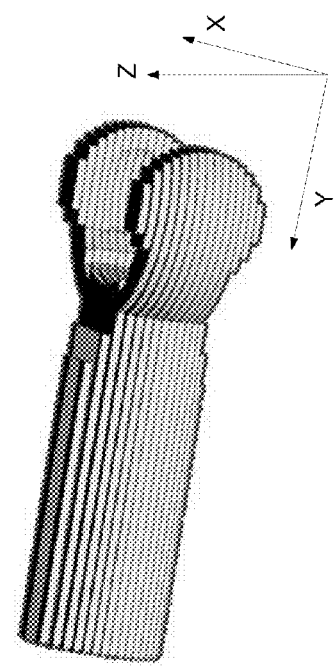
Figure 8D:
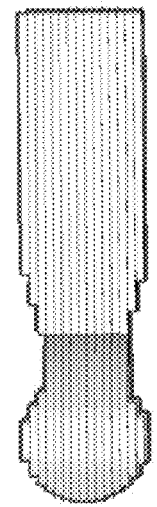
Figure 8C:
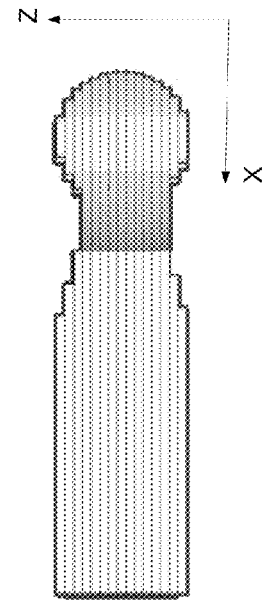
Figure 8F:
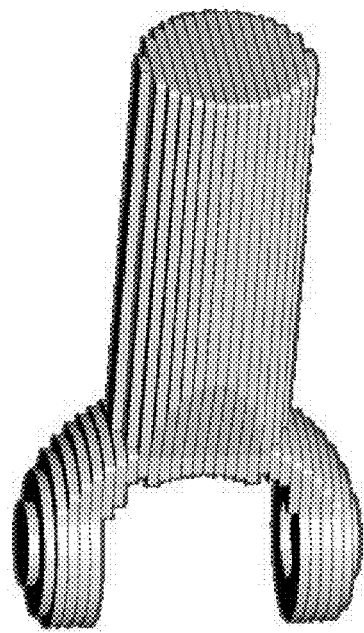
FIGS. 8E-8H provide perspective and plan views of layered versions of the left and right elements of FIGS. 5E and 5F as the left and right elements of FIGS. 5E and 5F might be formed from a plurality of adhered layers wherein the plane of stacking of the layers is perpendicular to the longitudinal axis of the device and is parallel to the faces of the retention arms of the elements.
Figure 8H:
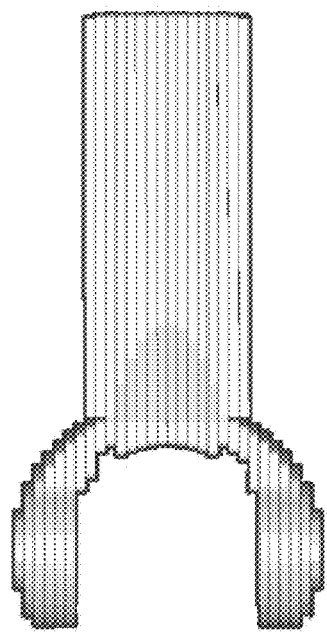
Figure 8E:
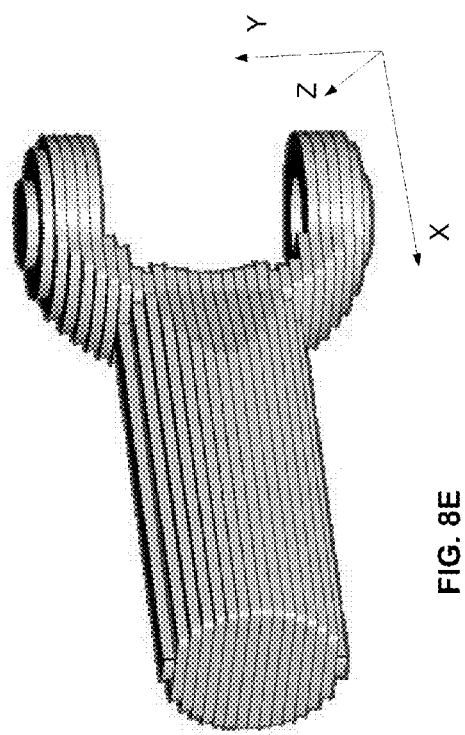
Figure 8G:
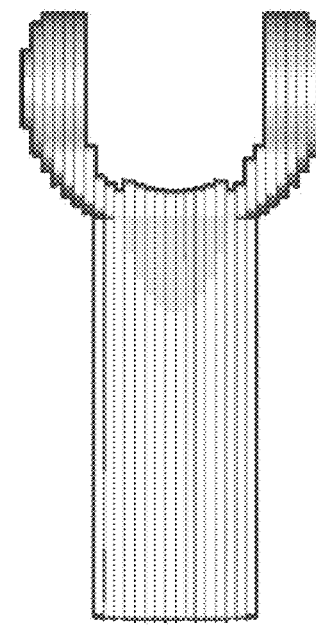
Figure 8I:
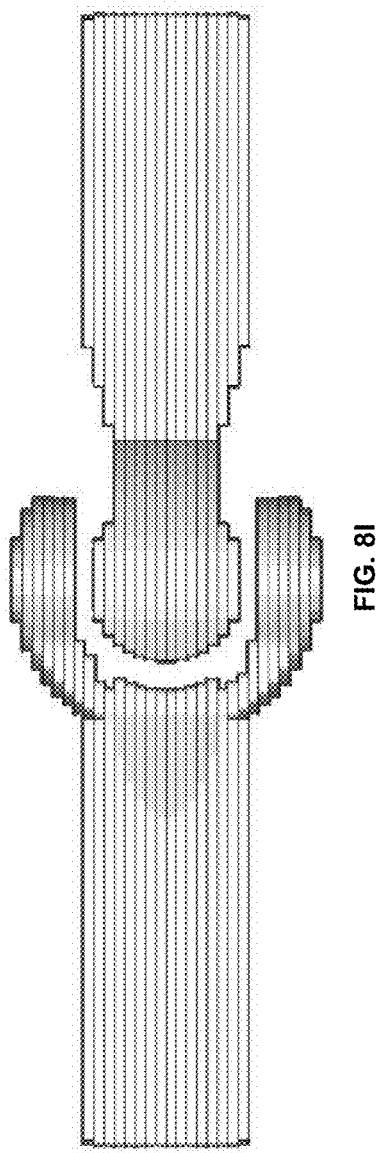
FIGS. 8I and 8J provide plan and perspective views of a left arm of the type of FIGS. 8E-8H and a right arm of the type of FIGS. 8A-8D in relative positions that they might have when holding a retention ball between them.
Figure 8J:
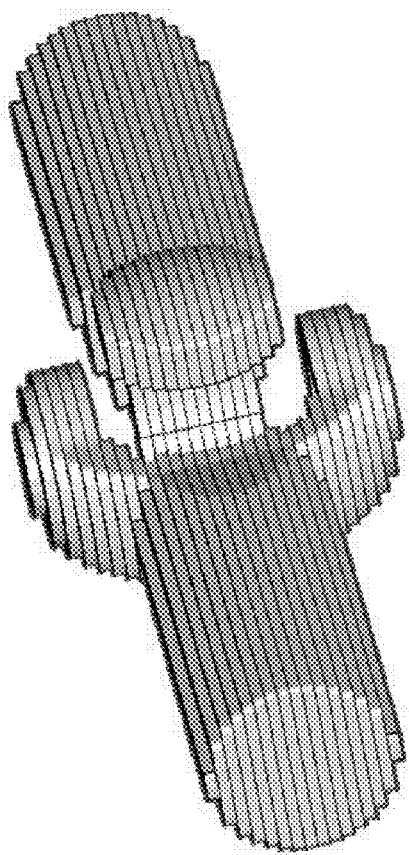

FIGS. 8I and 8J provide plan and perspective views of a left arm of the type of FIGS. 8E-8H and a right arm of the type of FIGS. 8A-8D in relative positions that they might have when holding a retention ball between them. Of course in other alternative embodiments, the two arms may be of the same type and simply rotated relative to each other after formation and release from the sacrificial material.

Figure 8K:
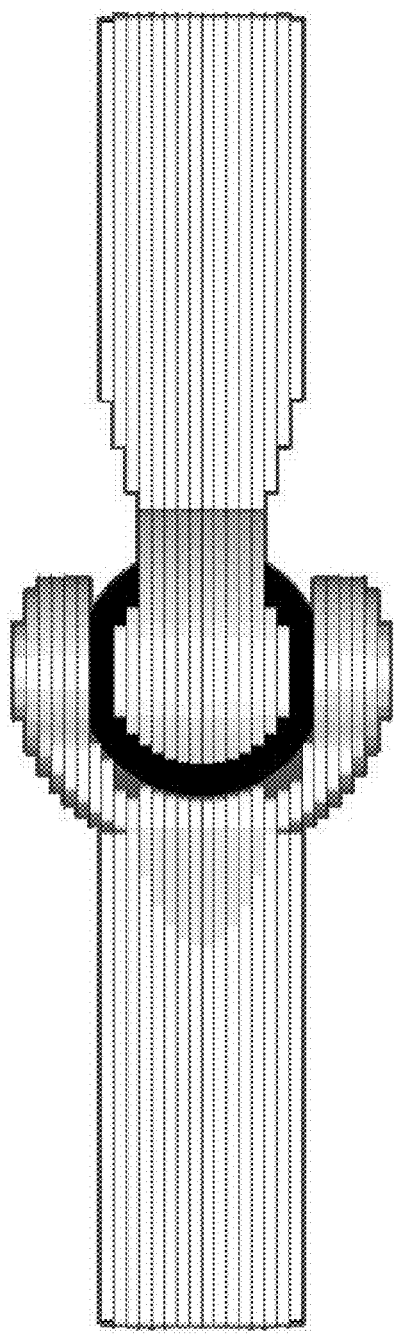
FIGS. 8K-8M provide, plan, end, and perspective views of the left and right elements of FIGS. 8G and 8F along with a linking ball that couples the elements together via elastic deformation and retention.
Figure 8M:
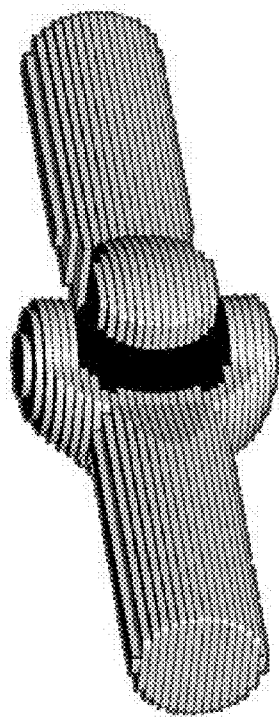
Figure 8L:
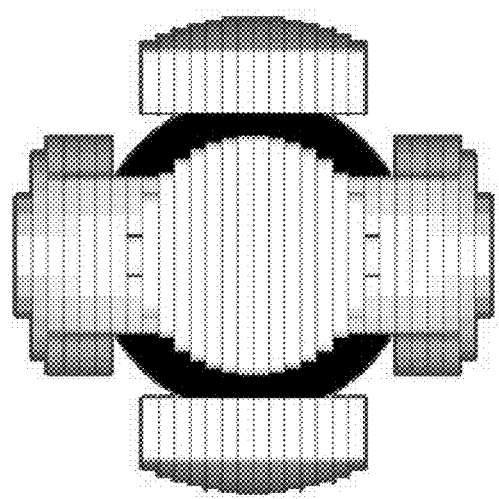

FIGS. 8K-8M provide, plan, end, and perspective views of the left and right elements of FIGS. 8G and 8F along with a linking ball that couples the elements together via elastic deformation and retention.

FURTHER COMMENTS AND CONCLUSIONS

Structural or sacrificial dielectric materials may be incorporated into embodiments of the present invention in a variety of different ways. Such materials may form a third material or higher deposited on selected layers or may form one of the first two materials deposited on some layers. Additional teachings concerning the formation of structures on dielectric substrates and/or the formation of structures that incorporate dielectric materials into the formation process and possibility into the final structures as formed are set forth in a number of patent applications filed Dec. 31, 2003. The first of these filings is U.S. Patent Application No. 60/534,184 which is entitled "Electrochemical Fabrication Methods Incorporating Dielectric Materials and/or Using Dielectric Substrates". The second of these filings is U.S. Patent Application No. 60/533,932, which is entitled "Electrochemical Fabrication Methods Using Dielectric Substrates". The third of these filings is U.S. Patent Application No. 60/534,157, which is entitled "Electrochemical Fabrication Methods Incorporating Dielectric Materials". The fourth of these filings is U.S. Patent Application No. 60/533,891, which is entitled "Methods for Electrochemically Fabricating Structures Incorporating Dielectric Sheets and/or Seed layers That Are Partially Removed Via Planarization". A fifth such filing is U.S. Patent Application No. 60/533,895, which is entitled "Electrochemical Fabrication Method for Producing Multi-layer Three-Dimensional Structures on a Porous Dielectric". Additional patent filings that provide teachings concerning incorporation of dielectrics into the EFAB process include U.S. patent application Ser. No. 11/139,262, filed May 26, 2005 by Lockard, et al., and which is entitled "Methods for Electrochemically Fabricating Structures Using Adhered Masks, Incorporating Dielectric Sheets, and/or Seed Layers that are Partially Removed Via Planarization"; and U.S. patent application Ser. No. 11/029,216, filed Jan. 3, 2005 by Cohen, et al., now abandoned, and which is entitled "Electrochemical Fabrication Methods Incorporating Dielectric Materials and/or Using Dielectric Substrates". These patent filings are each hereby incorporated herein by reference as if set forth in full herein.

Some embodiments may employ diffusion bonding or the like to enhance adhesion between successive layers of material. Various teachings concerning the use of diffusion bonding in electrochemical fabrication processes are set forth in U.S. patent application Ser. No. 10/841,384 which was filed May 7, 2004 by Cohen et al., now abandoned, which is entitled "Method of Electrochemically Fabricating Multilayer Structures Having Improved Interlayer Adhesion" and which is hereby incorporated herein by reference as if set forth in full. This application is hereby incorporated herein by reference as if set forth in full.

Some embodiments may incorporate elements taught in conjunction with other medical devices as set forth in various U.S. patent applications filed by the owner of the present application and/or may benefit from combined use with these other medical devices: Some of these alternative devices have been described in the following previously filed patent applications: (1) U.S. patent application Ser. No. 11/478,934, by Cohen et al., and entitled "Electrochemical Fabrication Processes Incorporating Non-Platable Materials and/or Metals that are Difficult to Plate On"; (2) U.S. patent application Ser. No. 11/582,049, by Cohen, and entitled "Discrete or Continuous Tissue Capture Device and Method for Making"; (3) U.S. patent application Ser. No. 11/625,807, by Cohen, and entitled "Microdevices for Tissue Approximation and Retention, Methods for Using, and Methods for Making"; (4) U.S. patent application Ser. No. 11/696,722, by Cohen, and entitled "Biopsy Devices, Methods for Using, and Methods for Making"; (5) U.S. patent application Ser. No. 11/734,273, by Cohen, and entitled "Thrombectomy Devices and Methods for Making"; (6) U.S. Patent Application No. 60/942,200, by Cohen, and entitled "Micro-Umbrella Devices for Use in Medical Applications and Methods for Making Such Devices"; and (7) U.S. patent application Ser. No. 11/444,999, by Cohen, and entitled "Microtools and Methods for Fabricating Such Tools". Each of these applications is incorporated herein by reference as if set forth in full herein.

Though the embodiments explicitly set forth herein have considered multi-material layers to be formed one after another. In some embodiments, it is possible to form structures on a layer-by-layer basis but to deviate from a strict planar layer on planar layer build up process in favor of a process that interlaces material between the layers. Such alternative build processes are disclosed in U.S. application Ser. No. 10/434,519, filed on May 7, 2003, now U.S. Pat. No. 7,252,861, entitled Methods of and Apparatus for Electrochemically Fabricating Structures Via Interlaced Layers or Via Selective Etching and Filling of Voids. The techniques disclosed in this referenced application may be combined with the techniques and alternatives set forth explicitly herein to derive additional alternative embodiments. In particular, the structural features are still defined on a planar-layer-by-planar-layer basis but material associated with some layers is formed along with material for other layers such that interlacing of deposited material occurs. Such interlacing may lead to reduced structural distortion during formation or improved interlayer adhesion. This patent application is herein incorporated by reference as if set forth in full.

The patent applications and patents set forth below are hereby incorporated by reference herein as if set forth in full. The teachings in these incorporated applications can be combined with the teachings of the instant application in many ways: For example, enhanced methods of producing structures may be derived from some combinations of teachings, enhanced structures may be obtainable, enhanced apparatus may be derived, and the like.

| U.S. patent application Ser. No., Filing Date U.S. App Pub No., Pub Date U.S. Pat. No., Issue Date | Inventor, Title |
|---|---|
| 09/493,496—Jan. 28, 200 U.S. Pat. No. 6,790,377—Sep. 14, 2004 | Cohen, "Method For Electrochemical Fabrication" |
| 10/677,556—Oct. 1, 2003 2004-0134772—Jul. 15, 2004 | Cohen, "Monolithic Structures Including Alignment and/or Retention Fixtures for Accepting Components" |

-continued

| U.S. patent application Ser. No., Filing Date U.S. App Pub No., Pub Date U.S. Pat. No., Issue Date | Inventor, Title |
|---|---|
| 10/830,262—Apr. 21, 2004 2004-0251142A—Dec. 16, 2004 U.S. Pat. No. 7,198,704—Apr. 3, 2007 | Cohen, "Methods of Reducing Interlayer Discontinuities in Electrochemically Fabricated Three-Dimensional Structures" |
| 10/271,574—Oct. 15, 2002 2003-0127336A—Jul. 10, 2003 U.S. Pat. No. 7,288,178—Oct. 30, 2007 | Cohen, "Methods of and Apparatus for Making High Aspect Ratio Microelectromechanical Structures" |
| 10/697,597—Dec. 20, 2002 2004-0146650A—Jul. 29, 2004 | Lockard, "EFAB Methods and Apparatus Including Spray Metal or Powder Coating Processes" |
| 10/677,498—Oct. 1, 2003 2004-0134788—Jul. 15, 2004 U.S. Pat. No. 7,235,166—Jun. 26, 2007 | Cohen, "Multi-cell Masks and Methods and Apparatus for Using Such Masks To Form Three-Dimensional Structures" |
| 10/724,513—Nov. 26, 2003 2004-0147124—Jul. 29, 2004 U.S. Pat. No. 7,368,044—May 6, 2008 | Cohen, "Non-Conformable Masks and Methods and Apparatus for Forming Three-Dimensional Structures" |
| 10/607,931—Jun. 27, 2003 2004-0140862—Jul. 22, 2004 U.S. Pat. No. 7,239,219—Jul. 3, 2007 | Brown, "Miniature RF and Microwave Components and Methods for Fabricating Such Components" |
| 10/841,100—May 7, 2004 2005-0032362—Feb. 10, 2005 U.S. Pat. No. 7,109,118—Sep. 19, 2006 | Cohen, "Electrochemical Fabrication Methods Including Use of Surface Treatments to Reduce Overplating and/or Planarization During Formation of Multi-layer Three-Dimensional Structures" |
| 10/387,958—Mar. 13, 2003 2003-022168A—Dec. 4, 2003 | Cohen, "Electrochemical Fabrication Method and Application for Producing Three-Dimensional Structures Having Improved Surface Finish" |
| 10/434,494—May 7, 2003 2004-0000489A—Jan. 1, 2004 | Zhang, "Methods and Apparatus for Monitoring Deposition Quality During Conformable Contact Mask Plating Operations" |
| 10/434,289—May 7, 2003 20040065555A—Apr. 8, 2004 | Zhang, "Conformable Contact Masking Methods and Apparatus Utilizing In Situ Cathodic Activation of a Substrate" |
| 10/434,294—May 7, 2003 2004-0065550A—Apr. 8, 2004 | Zhang, "Electrochemical Fabrication Methods With Enhanced Post Deposition Processing" |
| 10/434,295—May 7, 2003 2004-0004001A—Jan. 8, 2004 | Cohen, "Method of and Apparatus for Forming Three-Dimensional Structures Integral With Semiconductor Based Circuitry" |
| 10/434,315—May 7, 2003 2003-0234179 A—Dec. 25, 2003 U.S. Pat. No. 7,229,542—Dec. 25, 2003 | Bang, "Methods of and Apparatus for Molding Structures Using Sacrificial Metal Patterns" |
| 10/434,103—May 7, 2004 2004-0020782A—Feb. 5, 2004 U.S. Pat. No. 7,160,429—Jan. 9, 2007 | Cohen, "Electrochemically Fabricated Hermetically Sealed Microstructures and Methods of and Apparatus for Producing Such Structures" |
| 10/841,006—May 7, 2004 2005-0067292—May 31, 2005 | Thompson, "Electrochemically Fabricated Structures Having Dielectric or Active Bases and Methods of and Apparatus for Producing Such Structures" |
| 10/434,519—May 7, 2003 2004-0007470A—Jan. 15, 2004 U.S. Pat. No. 7,252,861—Aug. 7, 2007 | Smalley, "Methods of and Apparatus for Electrochemically Fabricating Structures Via Interlaced Layers or Via Selective Etching and Filling of Voids" |
| 10/724,515—Nov. 26, 2003 2004-0182716—Sep. 23, 2004 U.S. Pat. No. 7,291,254-Nov. 6, 2007 | Cohen, "Method for Electrochemically Forming Structures Including Non-Parallel Mating of Contact Masks and Substrates" |
| 10/841,347—May 7, 2004 2005-0072681—Apr. 7, 2005 | Cohen, "Multi-step Release Method for Electrochemically Fabricated Structures" |
| 60/533,947—Dec. 31, 2003 | Kumar, "Probe Arrays and Method for Making" |
| 60/534,183—Dec. 31, 2003 | Cohen, "Method and Apparatus for Maintaining Parallelism of Layers and/or Achieving Desired Thicknesses of Layers During the Electrochemical Fabrication of Structures" |
| 11/733,195—Apr. 9, 2007 2008-0050524—Feb. 28, 2008 | Kumar, "Methods of Forming Three-Dimensional Structures Having Reduced Stress and/or Curvature" |
| 11/506,586—Aug. 8, 2006 2007-0039828—Feb. 22, 2007 | Cohen, "Mesoscale and Microscale Device Fabrication Methods Using Split Structures and Alignment Elements" |
| 10/949,744—Sep. 24, 2004 2005-0126916—Jun. 16, 2005 | Lockard, "Three-Dimensional Structures Having Feature Sizes Smaller Than a Minimum Feature Size and Methods for Fabricating" |

Though various portions of this specification have been provided with headers, it is not intended that the headers be used to limit the application of teachings found in one portion of the specification from applying to other portions of the specification. For example, it should be understood that alternatives acknowledged in association with one embodiment, are intended to apply to all embodiments to the extent that the features of the different embodiments make such application functional and do not otherwise contradict or remove all benefits of the adopted embodiment. Various other embodiments of the present invention exist. Some of these embodiments may be based on a combination of the teachings herein with various teachings incorporated herein by reference.

In view of the teachings herein, many further embodiments, alternatives in design and uses of the embodiments of the instant invention will be apparent to those of skill in the art. As such, it is not intended that the invention be limited to the particular illustrative embodiments, alternatives, and uses described above but instead that it be solely limited by the claims presented hereafter.

We claim:

1. A method for forming a multi-element three-dimensional structure, comprising:
   (A) forming a first element of the multi-element three-dimensional structure from a plurality of successively formed layers, wherein each successive layer comprises at least two materials and is formed on and adhered to a previously formed layer, one of the at least two materials is a structural material and the other of the at least two materials is a sacrificial material, and wherein each successive layer defines a successive cross-section of the three-dimensional structure, and wherein the forming of each of the plurality of successive layers comprises:
      (i) depositing a first of the at least two materials;
      (ii) depositing a second of the at least two materials;
      (iii) planarizing the first and second materials; and
   (B) after the forming of the plurality of successive layers, separating at least a portion of the sacrificial material from multiple layers of the structural material to reveal the first element of the multi-element three-dimensional structure;
   (C) supplying a second element of the multi-element three-dimensional structure; and
   (D) bringing the first and second elements into contact with one another and elastically deforming at least an initial deformation portion of one of the elements relative to the other element to bring the at least two elements into a desired retention configuration which is maintained at least in part by the structural strength of the elements and the at least partial reformation of the deformation portion as the elements move into the retention configuration wherein the depositing of at least one of the two materials is by electroplating.

2. The method of claim 1 wherein only one of the first and second elements is formed from a plurality of adhered layers.

3. The method of claim 1 wherein both of the first and second elements are formed from a plurality of adhered layers.

4. The method of claim 1 wherein only one of the first and second elements are deformed during the elastic deforming by an amount which is greater than a tolerance used in forming the physical dimensions of the element.

5. The method of claim 1 wherein both of the first and second elements are deformed during the elastic deforming by amounts greater than a tolerance used in forming the physical dimensions of the elements.

6. The method of claim 1 wherein the first and second elements remain movable relative to each other after moving into the retention configuration.

7. The method of claim 1 wherein the first and second elements become fixed relative to each other after moving into the retention configuration.

8. The method of claim 1 wherein the first and second elements are linked to one another prior to joining via a linkage that undergoes plastic deformation as the first and second elements are brought into the retention configuration.

9. The method of claim 1 wherein the first and second elements are not connected to one another prior to bringing them into the retention configuration.

10. The method of claim 1 wherein the first element is also separated from a substrate on which it was formed.

11. The method of claim 1 wherein a third element is held in place relative to the first and second elements by the movement of the first and second elements into the retention configuration.

12. The method of claim 1 additionally comprising joining a third element to the assembly of the first and second elements by elastically joining the third element directly to one or both of the first and second elements.

13. A method for forming a multi-element three-dimensional structure, comprising:
   (A) forming a first element of the multi-element three-dimensional structure from a plurality of successively formed layers, wherein each successive layer comprises at least two materials and is formed on and adhered to a previously formed layer, wherein one of the at least two materials is a structural material and the other of the least two materials is a sacrificial material, and wherein each successive layer defines a successive cross-section of the three-dimensional structure, and wherein the forming of each of the plurality of successive layers comprises:
      (i) depositing a first of the at least two materials;
      (ii) depositing a second of the at least two materials;
      (iii) planarizing the first and second materials; and
   (B) after the forming of the plurality of successive layers, separating at least a portion of the sacrificial material from multiple layers of the structural material to reveal the first element of the multi-element three-dimensional structure;
   (C) supplying a second element of the multi-element three-dimensional structure;
   (D) deforming at least a deformation portion of at least one of the first and second elements and bringing the first and second elements into a desired retention position;
   (E) reducing or eliminating the deformation as or after the first and second elements are brought into the desired retention position;
   (F) moving a locking element into position to strengthen the deformation portion of the at least one of the first and second elements after the first and second elements are brought into the desired retention position so that the first and second elements are more strongly locked together in the retention position than they otherwise would be in the absence of the locking element wherein the depositing of at least one of the two materials is by electroplating.

14. The method of claim 13 wherein only one of the first and second elements is formed from a plurality of adhered layers.

15. The method of claim 13 wherein both of the first and second elements are formed from a plurality of adhered layers.

16. The method of claim 13 wherein only one of the first and second elements are deformed during the elastic deforming by an amount which is greater than a tolerance used in forming the physical dimensions of the element.

17. The method of claim 13 wherein both of the first and second elements are deformed during the elastic deforming by amounts greater than a tolerance used in forming the physical dimensions of the elements.

18. The method of claim 13 wherein the first and second elements remain movable relative to each other after moving into the retention position.

19. The method of claim 13 wherein the first and second elements become fixed relative to each other after moving into the retention position.

20. The method of claim 13 wherein the locking element comprises a portion of another element.

21. A method for forming a multi-element three-dimensional structure, comprising:
   (A) forming a first element of the multi-element three-dimensional structure from a plurality of successively formed layers, wherein each successive layer comprises at least two materials and is formed on and adhered to a previously formed layer, wherein one of the at least two materials is a structural material and the other of the at least two materials is a sacrificial material, and wherein each successive layer defines a successive cross-section of the three-dimensional structure, and wherein the forming of each of the plurality of successive layers comprises:
  (i) depositing a first of the at least two materials;
  (ii) depositing a second of the at least two materials;
  (iii) planarizing the first and second materials; and
(B) after the forming of the plurality of successive layers, separating at least a portion of the sacrificial material from multiple layers of the structural material to reveal the first element of the multi-element three-dimensional structure, wherein the first element has at least a retention region;
(C) supplying a second element of the multi-element three-dimensional structure wherein the second element has a retention region and wherein at least one of the first and second elements comprises a loading region connected via a path to the retention region of the element;
(D) joining the first and second elements to one another by moving the retention region of one element into the retention region of the other element, without deformation of either element, along the path including the loading region and wherein during normal use the first and second elements are configured relative to one another so that the loading region of one of the elements is not accessible to the retention region of the other of the first or second element wherein the depositing of at least one of the two materials is by electroplating.

22. The method of claim 21 wherein only one of the first and second elements is formed from a plurality of adhered layers.

23. The method of claim 21 wherein both of the first and second elements are formed from a plurality of adhered layers.

24. The method of claim 21 wherein only one of the first and second elements is deformed during the elastic deforming by an amount which is greater than a tolerance used in forming the physical dimensions of the element.

25. The method of claim 21 wherein both of the first and second elements are deformed during the elastic deforming by amounts greater than a tolerance used in forming the physical dimensions of the elements.

26. The method of claim 21 wherein the first and second elements remain movable relative to each other after joining.

27. The method of claim 21 wherein the first and second elements become fixed relative to each other after joining.

28. The method of claim 21 wherein both the first and second elements include loading regions.

* * * * *